United States Patent
Umezawa-Vizzini et al.

(10) Patent No.: US 9,403,924 B2
(45) Date of Patent: Aug. 2, 2016

(54) PROCESS OF PRODUCTION OF LARGE AND SPHERICAL POLYMERIZATION CATALYST AND USE OF SAME IN OLEFIN POLYMERIZATIONS

(71) Applicant: BASF Corporation, Florham Park, NJ (US)

(72) Inventors: Kayo Umezawa-Vizzini, Pasadena, TX (US); Michael Donald Spencer, Houston, TX (US)

(73) Assignee: BASF Corporation, Florham Park, NJ (US)

( * ) Notice: Subject to any disclaimer, the term of this patent is extended or adjusted under 35 U.S.C. 154(b) by 11 days.

(21) Appl. No.: 14/304,209

(22) Filed: Jun. 13, 2014

(65) Prior Publication Data
US 2015/0361194 A1    Dec. 17, 2015

(51) Int. Cl.
*C08F 110/06*    (2006.01)
(52) U.S. Cl.
CPC .................................. *C08F 110/06* (2013.01)
(58) Field of Classification Search
None
See application file for complete search history.

(56) References Cited

U.S. PATENT DOCUMENTS

| | | | |
|---|---|---|---|
| 4,784,983 A | 11/1988 | Mao et al. | |
| 4,861,847 A | 8/1989 | Mao et al. | |
| 5,100,849 A | 3/1992 | Miya et al. | |
| 6,376,417 B1 | 4/2002 | Yang et al. | |
| 2006/0105906 A1 | 5/2006 | Morini et al. | |
| 2012/0277090 A1* | 11/2012 | Spencer | C08F 10/00 502/107 |
| 2014/0073750 A1 | 3/2014 | Singh et al. | |
| 2014/0128556 A1 | 5/2014 | Marin et al. | |

OTHER PUBLICATIONS

International Search Report and Written Opinion of the International Searching Authority for Application No. PCT/US2015/035324 mailed Aug. 28, 2015, 13 pages.

* cited by examiner

*Primary Examiner* — Ling Choi
*Assistant Examiner* — Catherine S Branch
(74) *Attorney, Agent, or Firm* — Foley & Lardner LLP

(57) ABSTRACT

Solid catalyst particles for use in olefin polymerization, olefin polymerization catalyst systems containing the solid catalyst particles, methods of making the solid catalyst particles and the catalyst systems, and methods of polymerizing and copolymerizing olefins involving the use of the catalyst systems. The method of preparing the solid catalyst particles includes steps of maintaining a mixture of reactants at a temperature of about 5° C. to about 35° C. for at least 2 hours; increasing the temperature of said mixture to a temperature of about 40° C. to about 50° C. over a period of at least 3 hours; and increasing the temperature of said mixture to a temperature of about 80° C. to about 90° C.

20 Claims, 13 Drawing Sheets

PROCESS OF PRODUCTION OF LARGE AND SPHERICAL POLYMERIZATION CATALYST AND USE OF SAME IN OLEFIN POLYMERIZATIONS

TECHNICAL FIELD

The present disclosure relates to a process for the production of large and spherical polymerization catalyst and methods for making polyolefins therefrom.

BACKGROUND

Polyolefins are a class of polymers derived from simple olefins. Known methods of making polyolefins involve the use of Ziegler-Natta polymerization catalysts. These catalysts polymerize vinyl monomers using a transition metal halide to provide a polymer with an isotactic stereochemical configuration.

One type of Ziegler-Natta catalyst system comprises a solid catalyst component, constituted by a magnesium halide on which are supported a titanium compound and an internal electron donor compound. In order to maintain high selectivity for an isotactic polymer product, internal electron donor compounds must be added during catalyst synthesis. The internal donor can be various types. Conventionally, when a higher crystallinity of the polymer is required, an external donor compound is also added during the polymerization reaction.

During the past 30 years, numerous supported Ziegler-Natta catalysts have been developed which afford a much higher activity in olefin polymerization reactions and much higher content of crystalline isotactic fractions in the polymers they produce. With the development of internal and external electron donor compounds, polyolefin catalyst systems are continuously renovated.

U.S. Pat. Nos. 4,784,983 and 4,861,847 describe a catalyst system for use in olefinic polymerization and copolymerization that is comprised of components (A), (B) and (C). The catalyst component (A) consisting essentially of titanium, magnesium, halogen, polycarboxylic acid esters and organic phosphorus compounds is a solid product, being prepared by mixing titanium tetrahalide and auxiliary precipitant with a homogeneous solution of magnesium halide in a solvent system consisting essentially of an organic epoxy compound and an organic phosphorus compound to form a solid product which is then treated with a polycarboxylic acid ester and titanium tetrahalide. Component (B) is an organic aluminum compound, and component (C) is an organic silicon compound. The catalyst system has a very high activity, and the resultant polymers have very high stereospecificity and good granular appearance.

U.S. Pat. No. 6,376,417 describes a catalyst for the polymerization of propylene comprising components (A), (B) and (C). Component (A) is a solid product prepared by dissolving a halide of magnesium in a solvent system consisting of an organic epoxy compound, an organic phosphorus compound and an inert diluent to form a homogeneous solution; mixing the homogeneous solution with a halide of titanium to form a mixture; precipitating a solid from the mixture in the presence of an auxiliary precipitant; treating the solid with a polycarboxylic ester to load the ester on the solid; and treating the ester-loaded solid with the halide of titanium and the inert diluent. Component (B) is an organic aluminum compound, and component (C) is an organic silicon compound. The particle size of the catalyst can be adjusted by increasing the amount of the inert diluent at a low ratio of the epoxy compound to the phosphorus compound. However, in some cases, increasing the particle size by increasing the amount of inert diluent results in irregular catalyst morphology, for example, broadening particle size distribution, particle elongation, or reduction of bulk density. In addition, the increasing amount of the inert diluent to produce a larger particle size catalyst can be limited by the reactor size in a production scale.

The general production scheme for $MgCl_2$ supported catalysts includes a process to make $MgCl_2$ support, impregnation of $TiCl_4$ and internal donor to the $MgCl_2$ surface and the catalyst activation. One of the methods of $MgCl_2$ supported catalyst preparation is dissolution of solid $MgCl_2$ with organic reagents and precipitation of $MgCl_2$ with certain morphology.

Catalyst morphology control is one of the most important aspects of industrial polyolefin plant operation. Catalyst morphology characteristics include particle size and particle size distribution, particle shape, and surface texture.

Catalyst morphology characteristics influence polymer powder properties such as the bulk density, flowability, degassing and particle adhesion. Such properties greatly influence plant operation efficiency. For example, unsuitable catalyst morphology may cause failure in polymer morphology control, which can lead to serious trouble in plant operation, such as fouling or sheeting.

Because of these reasons, $MgCl_2$ supported catalysts with good morphology control (required particle size and shape, narrow particle size distribution, high bulk density and low adhesion) are desired.

SUMMARY

The following presents a simplified summary of the invention in order to provide a basic understanding of some aspects of the invention. This summary is not an extensive overview of the invention. It is intended to neither identify key or critical elements of the invention nor delineate the scope of the invention. Rather, the sole purpose of this summary is to present some concepts of the invention in a simplified form as a prelude to the more detailed description that is presented hereafter.

It is desired to improve the production process of catalyst particles to improve the catalyst morphology, such that the particles become more spherical. It has been found that adding a cold hold to the temperature ramp profile, followed by slow ramping, improves the morphology of the catalyst particles so that they become essentially spherical.

Provided is a method for improving the morphology of a solid catalyst component for use in olefinic polymerization. Various embodiments are listed below. It will be understood that the embodiments listed below may be combined not only as listed below, but in other suitable combinations.

Provided is a process for preparing a catalyst system used in olefinic polymerization, said process comprising the following steps:

(a) dissolving a magnesium compound, an organic oxygenate and an organic compound containing a group V element in at least one organic solvent to form a solution;

(b) dissolving an auxiliary precipitant in said solution;

(c) contacting a titanium compound with said solution to form a first mixture containing the magnesium compound and the titanium compound;

(d) maintaining said first mixture at a temperature of about 5° C. to about 35° C. for at least 2 hours;

(e) increasing the temperature of said first mixture to a temperature of about 40° C. to about 50° C. over a period of at least 3 hours, in particular about 3 hours to about 10 hours;

(f) increasing the temperature of said first mixture to a temperature of about 80° C. to about 90° C., in particular the temperature is increased over a period of about 0.5 hour to about 3 hours, more particularly over a period of about 1 hour to about 3 hours;

(g) washing said first mixture with a second mixture of said titanium compound and at least one aromatic organic solvent; and (h) treating said first mixture with a third mixture of said titanium compound and at least one aromatic organic solvent to produce substantially spherical catalyst particles having a diameter of from about 20 microns to about 45 microns (on a 50% by volume basis).

In some embodiments, first, second or third titanium compound is a titanium halide. In further embodiments, at least one of said first, second or third titanium halide is $TiCl_4$.

In some embodiments, step (f), (g) and/or (h) further comprises adding an electron donor. In further embodiments, electron donor is a carboxylic acid ester, an organic diether or an organic compound containing keto and ether groups. In yet further embodiments, the carboxylic acid ester is a phthalate or 1,8-naphthyl benzoate. In yet further embodiments, the organic compound is 1-[9-(methoxymethyl)fluoren-9-yl]alkan-1-one.

In some embodiments, in step (a) said organic oxygenate is an epoxy compound. In further embodiments, the epoxy compound comprises at least one selected from the group consisting of aliphatic epoxy compounds, alicyclic epoxy compounds, and aromatic epoxy compounds.

In some embodiments, in step (a) said organic compound containing a group V element is a phosphorus compound. In further embodiments, in step (a) the organic solvent is toluene or ethyl benzene. In yet further embodiments, in step (g) said titanium compound is at a concentration of from about 2% to about 50%.

In some embodiments, the auxiliary precipitant is an organic anhydride or organic acid. In further embodiments, the auxiliary precipitant is selected from the group consisting of succinic anhydride, maleic anhydride, naphthalic anhydride, diethylmaleate, diethylmalonate, dibutylmalonate, diethyladipate, dibutyladipate, di-n-butylphthalate, di-n-octylphthalate, di-i-butylphthalate, di-n-nonylphthalate, dibutylether diisoamylether, dihexyelether, and phthalic anhydride.

In some embodiments, the auxiliary precipitant is phthalic anhydride.

In some embodiments, the magnesium compound comprises at least one selected from the group consisting of magnesium chloride, magnesium bromide, magnesium iodide, magnesium fluoride, methoxy magnesium chloride, ethoxy magnesium chloride, isopropoxy magnesium chloride, butoxy magnesium chloride, octoxy magnesium chloride, phenoxy magnesium chloride, methylphenoxy magnesium chloride, ethoxy magnesium, isopropoxy magnesium, butoxy magnesium, n-octoxy magnesium, 2-ethyloxy magnesium, phenoxy magnesium, dimethylphenoxy magnesium, magnesium laurate and magnesium stearate. In further embodiments, the magnesium compound is $MgCl_2$.

Also provided are catalyst particles for use in olefinic polymerization made by a process comprising the following steps:

(a) dissolving a magnesium compound, an organic oxygenate and an organic compound containing a group V element in at least one organic solvent to form a solution;

(b) dissolving an auxiliary precipitant in said solution;

(c) contacting a titanium compound with said solution to form a first mixture containing the magnesium compound and the titanium compound;

(d) maintaining said first mixture at a temperature of about 5° C. to about 35° C. for at least 2 hours;

(e) increasing the temperature of said first mixture to a temperature of about 40° C. to about 50° C. over a period of at least 3 hours, in particular about 3 hours to about 10 hours;

(f) increasing the temperature of said first mixture to a temperature of about 80° C. to about 90° C., in particular the temperature is increased over a period of about 0.5 hour to about 3 hours, more particularly over a period of about 1 hour to about 3 hours;

(g) washing said first mixture with a second mixture of said titanium compound and at least one aromatic organic solvent; and (h) treating said first mixture with a third mixture of said titanium compound and at least one aromatic organic solvent to produce substantially spherical catalyst particles having a diameter of from about 20 microns to about 45 microns (on a 50% by volume basis).

In some embodiments, the first, second or third titanium compound is a titanium halide. In further embodiments, at least one of said first, second or third titanium halide is $TiCl_4$.

In some embodiments, step (f), (g) and/or (h) further comprises adding an electron donor. In further embodiments, the electron donor is a carboxylic acid ester, an organic diether or an organic compound containing keto and ether groups. In yet further embodiments, the carboxylic acid ester is a phthalate or 1,8-naphthyl benzoate. In yet further embodiments, the organic compound is 1-[9-(methoxymethyl)fluoren-9-yl]alkan-1-one.

In some embodiments, in step (a) said organic oxygenate is an epoxy compound. In further embodiments, the epoxy compound comprises at least one selected from the group consisting of aliphatic epoxy compounds, alicyclic epoxy compounds, and aromatic epoxy compounds.

In some embodiments, in step (a) said organic compound containing a group V element is a phosphorus compound. In further embodiments, in step (a) the organic solvent is toluene or ethyl benzene.

In some embodiments, in step (g) said titanium compound is at a concentration of from about 2% to about 50%.

In some embodiments, in step (h) said at least one aromatic organic solvent is selected from the group consisting of toluene and ethyl benzene.

In some embodiments, the auxiliary precipitant is phthalic anhydride.

In some embodiments, the magnesium compound comprises at least one selected from the group consisting of magnesium chloride, magnesium bromide, magnesium iodide, magnesium fluoride, methoxy magnesium chloride, ethoxy magnesium chloride, isopropoxy magnesium chloride, butoxy magnesium chloride, octoxy magnesium chloride, phenoxy magnesium chloride, methyiphenoxy magnesium chloride, ethoxy magnesium, isopropoxy magnesium, butoxy magnesium, n-octoxy magnesium, 2-ethyloxy magnesium, phenoxy magnesium, dimethylphenoxy magnesium, magnesium laurate and magnesium stearate. In further embodiments, the magnesium compound is $MgCl_2$.

Also provided is a method of polymerizing or copolymerizing an olefin, comprising the step of:

contacting an olefin with catalyst particles made by a process comprising the following steps:

(a) dissolving a magnesium compound, an organic oxygenate and an organic compound containing a group V element in at least one organic solvent to form a solution;

(b) dissolving an auxiliary precipitant in said solution;

(c) contacting a titanium compound with said solution to form a first mixture containing the magnesium compound and the titanium compound;

(d) maintaining said first mixture at a temperature of about 5° C. to about 35° C. for at least 2 hours;

(e) increasing the temperature of said first mixture to a temperature of about 40° C. to about 50° C. over a period of at least 3 hours, in particular about 3 hours to about 10 hours;

(f) increasing the temperature of said first mixture to a temperature of about 80° C. to about 90° C., in particular the temperature is increased over a period of about 0.5 hour to about 3 hours, more particularly over a period of about 1 hour to about 3 hours;

(g) washing said first mixture with a second mixture of said titanium compound and at least one aromatic organic solvent; and (h) treating said first mixture with a third mixture of said titanium compound and at least one aromatic organic solvent to produce substantially spherical catalyst particles having a diameter of from about 20 microns to about 45 microns (on a 50% by volume basis).

BRIEF DESCRIPTION OF THE FIGURES

The following detailed description can be read in connection with the accompanying drawings in which like numerals designate like elements and in which.

DETAILED DESCRIPTION

Figure 1A:
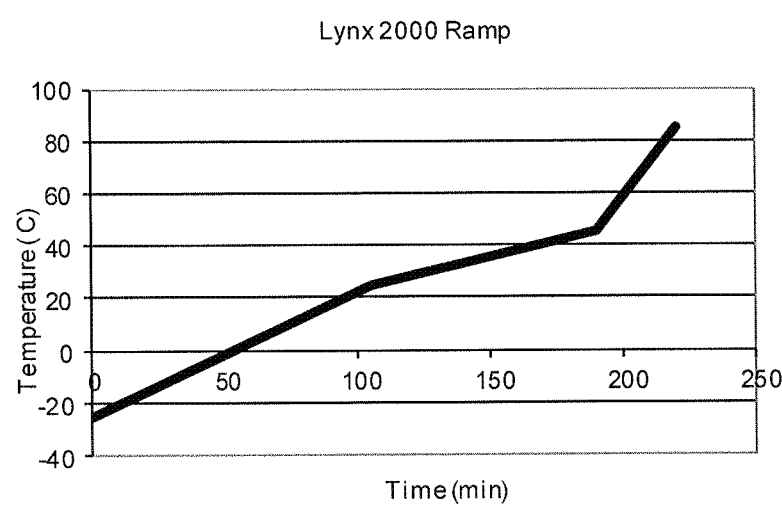
FIG. 1A shows the temperature ramp profile for Comparative Example 1.

Before describing several exemplary embodiments, it is to be understood that the invention is not limited to the details of construction or process steps set forth in the following description. The invention is capable of other embodiments and of being practiced or being carried out in various ways.

Reference throughout this specification to "one embodiment," "certain embodiments," "one or more embodiments" or "an embodiment" means that a particular feature, structure, material, or characteristic described in connection with the embodiment is included in at least one embodiment. Thus, the appearances of the phrases such as "in one or more embodiments," "in certain embodiments," "in one embodiment" or "in an embodiment" in various places throughout this specification are not necessarily referring to the same embodiment. Furthermore, the particular features, structures, materials, or characteristics may be combined in any suitable manner in one or more embodiments.

Although reference herein is to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

Described are solid catalyst components for use in olefin polymerization, olefin polymerization catalyst systems containing the solid catalyst components, methods of making the solid catalyst components and the catalyst systems, and methods of polymerizing and copolymerizing olefins involving the use of the catalyst systems. The solid catalyst components include titanium, magnesium, halogen, and optional internal electron donor compounds. The methods of polymerizing or copolymerzing olefins involve contacting olefins with catalyst systems containing a solid catalyst component, an organoaluminum compound, and an organosilicon compound.

An exemplary method for preparing a solid catalyst component for use in olefinic polymerization includes the steps of:

(a) dissolving a magnesium compound, an organic oxygenate and an organic compound containing a group V element in at least one organic solvent to form a solution;

(b) dissolving an auxiliary precipitant in said solution;

(c) contacting a titanium compound with said solution to form a mixture containing the magnesium compound and the titanium compound;

(d) maintaining said mixture at a temperature of about 5° C. to about 35° C. for at least 2 hours;

(e) increasing the temperature of said mixture to a temperature of about 40° C. to about 50° C. over a period of about 3 hours to about 10 hours;

(f) increasing the temperature of said mixture to a temperature of about 80° C. to about 90° C. over a period of about 0.5 hour to about 3 hours;

(g) washing the precipitate with a second mixture of said titanium compound and at least one aromatic organic solvent; and (h) treating the precipitate with a third mixture of said titanium compound and at least one aromatic organic solvent to produce substantially spherical catalyst particles having a diameter of from about 20 microns to about 45 microns (on a 50% by volume basis).

The catalysts/methods of embodiments of the invention can in some instances lead to the production of poly-alpha-olefins having xylene solubles (XS) from about 0.5% to about 10%. In another embodiment, poly-alpha-olefins having xylene solubles (XS) from about 1.5% to about 8% are produced. XS refers to the percent of solid polymer that dissolves into xylene. A low XS % value generally corresponds to a highly isotactic polymer (i.e. higher crystallinity), whereas a high XS % value generally corresponds to a low isotactic polymer. Different steps of the methods for producing the catalysts result in catalysts that can produce polymers with different XS values.

The solid catalyst component can be a highly active catalyst component comprising a reaction product of a titanium compound, a magnesium compound, and an optional internal electron donor compound.

The titanium compounds used in the preparation of the solid catalyst component include, for example, a tetravalent titanium compound represented by chemical formula (I):

$$Ti(OR)_g X_{4-g} \tag{I}$$

wherein R represents a hydrocarbon group, such as an alkyl group having 1 to about 20 carbon atoms, X represents a halogen atom, and $0 \leq g \leq 4$. Specific examples of the titanium compound include, but are not limited to titanium tetrahalides such as $TiCl_4$, $TiBr_4$ and $TiI_4$; alkoxytitanium trihalides such as $Ti(OCH_3)Cl_3$, $Ti(OC_2H_5)Cl_3$, $Ti(O-n-C_4H_9)Cl_3$, $Ti(OC_2H_5)Br_3$ and $Ti(O-i-C_4H_9)Br_3$; dialkoxytitanium dihalides such as $Ti(OCH_3)_2Cl_2$, $Ti(OC_2H_5)_2Cl_2$, $Ti(O-nC_4H_9)_2Cl_2$ and $Ti(OC_2H_5)_2Br_2$; trialkoxytitanium monohalides such as $Ti(OCH_3)_3Cl$, $Ti(OC_2H_5)_3Cl$, $Ti(O-n-C_4H_9)_3Cl$ and $Ti(OC_2H_5)_3Br$; and tetraalkoxytitaniums such as $Ti(OCH_3)_4$, $Ti(OC_2H_5)_4$ and $Ti(O-n-C_4H_9)_4$. In some embodiments, the halogen containing titanium compounds, such as titanium tetrahalides, are used. These titanium compounds may be used individually or in solutions of hydrocarbon compounds or halogenated hydrocarbons.

The magnesium compounds used in the preparation of the solid catalyst component include, for example, a magnesium compound having no reducibility. In one embodiment, the magnesium compound having no reducibility is a halogen-containing magnesium compound. Specific examples of the magnesium compound having no reducibility include, but are not limited to magnesium halides such as magnesium chloride, magnesium bromide, magnesium iodide and magnesium fluoride; alkoxy magnesium halides such as methoxy magnesium chloride, ethoxy magnesium chloride, isopropoxy magnesium chloride, butoxy magnesium chloride and octoxy magnesium chloride; aryloxy magnesium halides such as phenoxy magnesium chloride and methylphenoxy magnesium chloride; alkoxy magnesiums such as ethoxy magnesium, isopropoxy magnesium, butoxy magnesium, n-octoxy magnesium and 2-ethylhexoxy magnesium; aryloxy magnesiums such as phenoxy magnesium and dimethyl phenoxy magnesium; and carboxylic acid salts of magnesium such as magnesium laurate and magnesium stearate. These magnesium compounds may be in the liquid or solid state. In one aspect, halogen containing magnesium compounds, such as magnesium chloride, alkoxy magnesium chlorides and aryloxy magnesium chlorides, are employed.

The organic oxygenate used in the preparation of the solid catalyst component include, for example, epoxy compound. Specific examples of the organic oxygenate include, but are not limited to aliphatic epoxy compounds, alicyclic epoxy compounds, and aromatic epoxy compounds. Epoxides react directly with magnesium chloride to form magnesium alkoxide species. Magnesium alkoxide species may also be made from mixing magnesium chloride and magnesium dialkoxides (made for example by direct addition of the appropriate alcohol and magnesium metal).

Further specific examples of the organic oxygenate include, but are not limited to aliphatic epoxy compounds, alicyclic epoxy compounds, aromatic epoxy compounds, or the like. Examples of aliphatic epoxy compounds include halogenated aliphatic epoxy compounds, aliphatic epoxy compounds having a keto group, aliphatic epoxy compounds having an ether bond, aliphatic epoxy compounds having an ester bond, aliphatic epoxy compounds having a tertiary amino group, aliphatic epoxy compounds having a cyano group, or the like. Examples of alicyclic epoxy compounds include halogenated alicyclic epoxy compounds, alicyclic epoxy compounds having a keto group, alicyclic epoxy compounds having an ether bond, alicyclic epoxy compounds having an ester bond, alicyclic epoxy compounds having a tertiary amino group, alicyclic epoxy compounds having a cyano group, or the like. Examples of aromatic epoxy compounds include halogenated aromatic epoxy compounds, aromatic epoxy compounds having a keto group, aromatic epoxy compounds having an ether bond, aromatic epoxy compounds having an ester bond, aromatic epoxy compounds having a tertiary amino group, aromatic epoxy compounds having a cyano group, or the like.

Specific examples of aliphatic epoxy compounds include ethylene oxide, propylene oxide, 1,2-epoxybutane, 2,3-epoxybutane, 1,2-epoxyhexane, 1,2-epoxyoctane, 1,2-epoxydecane, 1,2-epoxydodecane, 1,2-epoxytetradecane, 1,2-epoxyhexadecane, 1,2-epoxyoctadecane, 7,8-epoxy-2-methyloctadecane, 2-vinyloxirane, 2-methyl-2-vinyloxirane, 1,2-epoxy-5-hexene, 1,2-epoxy-7-octene, 1-phenyl-2,3-epoxypropane, 1-(1-naphthyl)-2,3-epoxypropane, 1-cyclohexyl-3,4-epoxybutane, 1,3-butadiene dioxide, 1,2,7,8-diepoxyoctane, or the like. Specific examples of alicyclic epoxy compounds include cyclopentene oxide, 3-methyl-1,2-cyclopentene oxide, cyclohexene oxide, cyclooctene oxide, alpha-pinene oxide, 2,3-epoxynorbornane, limonene oxide, cyclododecane epoxide, 2,3,5,6-diepoxynorbornane, or the like. Specific examples of aromatic epoxy compounds include styrene oxide, 3-methylstyrene oxide, 1,2-epoxybutylbenzene, 1,2-epoxyoctylbenzene, stilbene oxide, 3-vinylstyrene oxide, 1-(1-methyl-1,2-epoxyethyl)-3-(1-methylvinyl)benzene, 1,4-bis(1,2-epoxypropyl)benzene, 1,3-bis(1,2-epoxy-1-methylethyl)benzene, 1,4-bis(1,2-epoxy-1-methylethyl)benzene.

Specific examples of halogenated aliphatic epoxy compounds include epifluorohydrin, epichlorohydrin, epibromohydrin, hexafluoropropylene oxide, 1,2-epoxy-4-fluorobutane, 1-(2,3-epoxypropyl)-4-fluorobenzene, 1-(3,4-epoxybutyl)-2-fluorobenzene, 1-(2,3-epoxypropyl)-4-chlorobenzene, 1-(3,4-epoxybutyl)-3-chlorobenzene, or the like. Specific examples of halogenated alicyclic epoxy compounds include 4-fluoro-1,2-cyclohexene oxide, 6-chloro-2,3-epoxybicyclo[2.2.1]heptane, or the like. Specific examples of halogenated aromatic epoxy compounds include 4-fluorostyrene oxide, 1-(1,2-epoxypropyl)-3-trifluorobenzene, or the like.

Specific examples of aliphatic epoxy compounds having a keto group include 3-acetyl-1,2-epoxypropane, 4-benzoyl-1,2-epoxybutane, 4-(4-benzoyl)phenyl-1,2-epoxybutane, 4,4'-bis(3,4-epoxybutyl)benzophenone, or the like. Specific examples of alicyclic epoxy compounds having a keto group include 3,4-epoxy-1-cyclohexanone, 2,3-epoxy-5-oxobicyclo[2.2.1]heptane, or the like. Specific examples of aromatic epoxy compounds having a keto group include 3-acetylstyrene oxide, 4-(1,2-epoxypropyl)benzophenone, or the like.

Specific examples of aliphatic epoxy compounds having an ether bond include glycidyl methyl ether, butyl glycidyl ether, 2-ethylhexyl glycidyl ether, allyl glycidyl ether, ethyl 3,4-epoxybutyl ether, glycidyl phenyl ether, glycidyl 4-tert-butylphenyl ether, glycidyl 4-chlorophenyl ether, glycidyl 4-methoxyphenyl ether, glycidyl 2-phenylphenyl ether, glycidyl 1-naphthyl ether, glycidyl 4-indolyl ether, glycidyl N-methyl-alpha-quinolon-4-yl ether, ethyleneglycol diglycidyl ether, 1,4-butanediol diglycidyl ether, 1,2-diglycidyloxybenzene, 2,2-bis(4-glycidyloxyphenyl)propane, tris(4-glycidyloxyphenyl)methane, poly(oxypropylene)triol triglycidyl ether, a glycidyl ether of phenol novolac, or the like. Specific examples of alicyclic epoxy compounds having an ether bond include 1,2-epoxy-4-methoxycyclohexane, 2,3-epoxy-5,6-dimethoxybicyclo[2.2.1]heptane, or the like. Specific examples of aromatic epoxy compounds having an ether bond include 4-methoxystyrene oxide, 1-(1,2-epoxybutyl)-2-phenoxybenzene, or the like.

Specific examples of aliphatic epoxy compounds having an ester bond include glycidyl formate, glycidyl acetate, 2,3-epoxybutyl acetate, glycidyl butyrate, glycidyl benzoate, diglycidyl terephthalate, poly(glycidyl acrylate), poly(glycidyl methacrylate), a copolymer of glycidyl acrylate with another monomer, a copolymer of glycidyl methacrylate with another monomer, or the like. Specific examples of alicyclic epoxy compounds having an ester bond include 1,2-epoxy-4-methoxycarbonylcyclohexane, 2,3-epoxy-5-butoxycarbonylbicyclo[2.2.1]heptane, or the like. Specific examples of aromatic epoxy compounds having an ester bond include ethyl 4-(1,2-epoxyethyl)benzoate, methyl 3-(1,2-epoxybutyl)benzoate, methyl 3-(1,2-epoxybutyl)-5-phenylbenzoate, or the like.

Specific examples of aliphatic epoxy compounds having a tertiary amino group include N,N-glycidylmethylacetamide, N,N-ethylglycidylpropionamide, N,N-glycidylmethylbenzamide, N-(4,5-epoxypentyl)-N-methylbenzamide, N,N-diglycidylaniline, bis(4-diglycidylaminophenyl)methane, poly(N,N-glycidylmethylacrylamide), or the like. Specific examples of alicyclic epoxy compounds having a tertiary amino group include 1,2-epoxy-3-(diphenylcarbamoyl)cyclohexane, 2,3-epoxy-6-(dimethylcarbamoyl)bicyclo[2.2.1]heptane, or the like. Specific examples of aromatic epoxy compounds having a tertiary amino group include 2-(dimethylcarbamoyl)styrene oxide, 4-(1,2-epoxybutyl)-4'-(dimethylcarbamoyl)biphenyl, or the like.

Specific examples of aliphatic epoxy compounds having a cyano group include 4-cyano-1,2-epoxybutane, 1-(3-cyanophenyl)-2,3-epoxybutane, or the like. Specific examples of alicyclic epoxy compounds having a cyano group include 2-cyanostyrene oxide, 6-cyano-1-(1,2-epoxy-2-phenylethyl)naphthalene, or the like.

In certain embodiments, the organic oxygenate is dissolved in the at least one organic solvent in a ratio with the magnesium compound of 0.1:1 to 10:1 or 0.5:1 to 4:1 or 0.9:1 to 2.2:1. In one aspect, an epoxy, such as epichlorohydrin, is employed.

The organic compound containing at least a group V element includes, for example, a phosphorus compound. Other possibilities include tertiary amines, for example, triethylamine or tributylamine. Further specific examples of the organic oxygenate include, but are not limited to phosphate acid esters such as a trialkyl phosphateacid ester. A trialkyl phosphate acid ester can be a compound with the structure of Formula II:

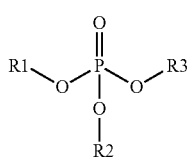

(II)

where $R^1$, $R^2$, and $R^3$ are, independently, selected from one or more of methyl, ethyl, propyl, isopropyl, butyl, isobutyl, tertbutyl, alkyl groups having from 1 to about 10 carbon atoms, and branched alkyl groups having from about 3 to about 10 carbon atoms. In one embodiment, the trialkyl phosphate acid ester is tributyl phosphate acid ester. In other embodiments, the trialkyl phosphate ester is hexamethylphosphoramide, triethylphosphate, tributylphosphate, tripentylphosphate, or trihexylphosphate.

In certain embodiments, the organic compound containing at least a group V element is dissolved in the at least one organic solvent in a ratio with the magnesium compound of 0.5:1 to 4:1 or 0.5:1 to 2.0:1 or 0.7:1 to 1:1.

The organic solvent includes, for example, toluene or ethyl benzene. Other examples include xylene, ethyl benzene, naphthalene, and the like, alkanes such as butane, pentane, hexane, heptane, octanes, cyclopentane, and cyclohexane; oxygen containing compounds such as alcohols and glycols; ketones; esters; ethers; and the like. The aromatic organic solvent includes, for example, toluene or ethyl benzene.

The auxiliary precipitant includes, for example, phthalic anhydride. Other examples include organic acids, organic acid anhydrides, ketones, ethers, succinic anhydride, maleic anhydride, acrylic acid, methacrylic acid, methylethylketone, dibutylether, diisoamylether, diisopropyl ether. In certain embodiments, the auxiliary precipitant is dissolved in the solution in a ratio with the magnesium compound of 0.05:1 to 1.0:1 or 0.1:1 to 0.4:1 or 0.15:1 to 0.25:1.

The electron donor includes, for example, a carboxylic acid ester, an organic diether or an organic compound containing keto and ether groups. In yet further embodiments, the carboxylic acid ester is a phthalate or 1,8-naphthyl benzoate. In yet further embodiments, the organic compound is 1-[9-(methoxymethyl)fluoren-9-yl]alkan-1-one. Further examples of electron donors include oxygen-containing electron donors such organic acid esters, polycarboxylic acid esters, polyhydroxy ester, heterocyclic polycarboxylic acid esters, inorganic acid esters, alicyclic polycarboxylic acid esters and hydroxy-substituted carboxylic acid esters compounds having 2 to about 30 carbon atoms such as methyl formate, ethyl acetate, vinyl acetate, propyl acetate, octyl acetate, cyclohexyl acetate, ethyl propionate, methyl butyrate, ethyl valerate, ethyl stearate, methyl chloroacetate, ethyl dichloroacetate, methyl methacrylate, ethyl crotonate, dibutyl maleate, diethyl butylmalonate, diethyl dibutylmalonate, ethyl cyclohexanecarboxylate, diethyl 1,2-cyclohexanedicarboxylate, di-2-ethylhexyl 1,2-cyclohexanedicarboxylate, methyl benzoate, ethyl benzoate, propyl benzoate, butyl benzoate, octyl benzoate, cyclohexyl benzoate, phenyl benzoate, benzyl benzoate, methyl toluate, ethyl toluate, amyl toluate, ethyl ethylbenzoate, methyl anisate, ethyl anisate, ethyl ethoxybenzoate, dimethyl phthalate, diethyl phthalate, dipropyl phthalate, diisopropyl phthalate, dibutyl phthalate, diisobutyl phthalate, dioctyl phthalate, .gamma.-butyrolactone, .delta.-valerolactone, coumarine, phthalide, ethylene carbonate, ethyl silicate, butyl silicate, vinyltriethoxysilane, phenyltriethoxysilane and diphenyldiethoxysilane; alicyclic polycarboxylic acid esters such as diethyl 1,2-cyclohexanecarboxylate, diisobutyl 1,2-cyclohexanecarboxylate, diethyl tetrahydrophthalate and nadic acid, diethyl ester; aromatic polycarboxylic acid esters such as monoethyl phthalate, dimethyl phthalate, methylethyl phthalate, monoisobutyl phthalate, mono-n-butyl phthalate, diethyl phthalate, ethyl isobutyl phthalate, ethyl-n-butyl phthalate, di-n-propyl phthalate, diisopropyl phthalate, di-n-butyl phthalate, diisobutyl phthalate, di-n-heptyl phthlate, di-2-ethylhexyl phthalate, di-n-octyl phthalate, dineopentyl phthalate, didecyl phthalate, benzylbutyl phthalate, diphenyl phthalate, diethyl naphthalenedicarboxylate, dibutyl naphthlenedicarboxylate, triethyl trimelliatate and dibutyl trimellitate, 3,4-furanedicarboxylic acid esters, 1,2-diacetoxybenzene, 1-methyl-2,3-diacetoxybenzene, 2-methyl-2,3-diacetoxybenzene, 2,8-diacetoxynaphthalene, ethylene glycol dipivalate, butanediol pivalate, benzoylethyl salicylate, acetylisobutyl salicylate and acetylmethyl salicylate.

Long-chain dicarboxylic acid esters, such as diethyl adipate, diisobutyl adipate, diisopropyl sebacate, di-n-butyl sebacate, di-n-octyl sebacate and di-2-ethylhexyl sebacate, may also be used as the polycarboxylic acid esters that can be included in the titanium catalyst component. Among these polyfunctional esters, compounds having the skeletons given by the above general formulae are preferred. Also preferred are esters formed between phthalic acid, maleic acid or substituted malonic acid and alcohols having at least about 2 carbon atoms, diesters formed between phthalic acid and alcohols having at least about 2 carbon atoms are especially preferred. Monocarboxylic acid esters represented by RCOOR' where R and R' are hydrocarbonyl groups that can have a substituent, and at least one of them is a branched or ring-containing aliphatic group alicyclic. Specifically, at least one of R and R' may be $(CH_3)_2CH-$, $C_2H_5CH(CH_3)-$, $(CH_3)_2CHCH_2-$, $(CH_3)_3C-$, $C_2H_5CH_2-$, $(CH_3)CH_2-$, cyclohexyl, methylbenzyl, para-xylyl, acrylic, and carbonylbenzyl. If either one of R and R' is any of the above-described group, the other may be the above group or another group such as a linear or cyclic group. Specific examples of the monocarboxylic acid esters include monoesters of dimethylacetic acid, trimethylacetic acid, alpha-methylbutyric acid, beta-methylbutyric acid, methacrylic acid and benzoylacetic acid; and monocarboxylic acid esters formed with alcohols such as methanol, ethanol, isopropanol, isobutanol and tert-butanol.

Additional useful internal electron donors include internal electron donors containing at least one ether group and at least one ketone group. That is, the internal electron donor compound contains in its structure at least one ether group and at least one ketone group.

Examples of internal electron donors containing at least one ether group and at least one ketone group include compounds of the following Formula III.

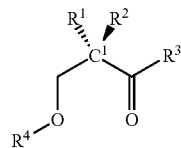

(III)

wherein $R^1$, $R^2$, $R^3$, and $R^4$ are identical or different, and each represents a substituted or unsubstituted hydrocarbon group. In one embodiment, the substituted or unsubstituted hydrocarbon group includes from 1 to about 30 carbon atoms. In another embodiment, $R^1$, $R^2$, $R^3$, and $R^4$ are identical or different, and each represents a linear or branched alkyl group containing from 1 to about 18 carbon atoms, a cycloaliphatic group containing from about 3 to about 18 carbon atoms, an aryl group containing from about 6 to about 18 carbon atoms, an alkylaryl group containing from about 7 to about 18 carbon atoms, and an arylalkyl group containing from about 7 to about 18 carbon atoms. In yet another embodiment, $R^1$, $C^1$ and $R^2$ are a part of a substituted or unsubstituted cyclic or polycyclic structure containing from about 5 to about 14 carbon atoms. In still yet another embodiment, the cyclic or polycyclic structure has one or more substitutes selected from the group consisting of a linear or branched alkyl group containing from 1 to about 18 carbon atoms, a cycloaliphatic group containing from about 3 to about 18 carbon atoms, an aryl group containing from about 6 to about 18 carbon atoms, an alkylaryl group containing from about 7 to about 18 carbon atoms, and an arylalkyl group containing from about 7 to about 18 carbon atoms.

Specific examples of internal electron donors containing at least one ether group and at least one ketone group include 9-(alkylcarbonyl)-9'-alkoxymethylfluorene including 9-(methylcarbonyl)-9'-methoxymethylfluorene, 9-(methylcarbonyl)-9'-ethoxymethylfluorene, 9-(methylcarbonyl)-9'-propoxymethylfluorene, 9-(methylcarbonyl)-9'-butoxymethylfluorene, 9-(methylcarbonyl)-9'-pentoxymethylfluorene, 9-(ethylcarbonyl)-9'-methoxymethylfluorene, 9-(ethylcarbonyl)-9'-ethoxymethylfluorene, 9-(ethylcarbonyl)-9'-propoxymethylfluorene, 9-(ethylcarbonyl)-9'-butoxymethylfluorene, 9-(ethylcarbonyl)-9'-pentoxymethylfluorene, 9-(propylcarbonyl)-9'-methoxymethylfluorene, 9-(propylcarbonyl)-9'-ethoxymethylfluorene, 9-(propylcarbonyl)-9'-propoxymethylfluorene, 9-(propylcarbonyl)-9'-butoxymethylfluorene, 9-(propylcarbonyl)-9'-pentoxymethylfluorene, 9-(butylcarbonyl)-9'-methoxymethylfluorene, 9-(butylcarbonyl)-9'-ethoxymethylfluorene, 9-(butylcarbonyl)-9'-propoxymethylfluorene, 9-(butylcarbonyl)-9'-butoxymethylfluorene, 9-(butylcarbonyl)-9'-pentoxymethylfluorene, 9-(pentylcarbonyl)-9'-methoxymethylfluorene, 9-(pentylcarbonyl)-9'-ethoxymethylfluorene, 9-(pentylcarbonyl)-9'-propoxymethylfluorene, 9-(pentylcarbonyl)-9'-butoxymethylfluorene, 9-(pentylcarbonyl)-9'-pentoxymethylfluorene, 9-(hexylcarbonyl)-9'-methoxymethylfluorene, 9-(hexylcarbonyl)-9'-ethoxymethylfluorene, 9-(hexylcarbonyl)-9'-propoxymethylfluorene, 9-(hexylcarbonyl)-9'-butoxymethylfluorene, 9-(hexylcarbonyl)-9'-pentoxymethylfluorene, 9-(octylcarbonyl)-9'-methoxymethylfluorene, 9-(octylcarbonyl)-9'-ethoxymethylfluorene, 9-(octylcarbonyl)-9'-propoxymethylfluorene, 9-(octylcarbonyl)-9'-butoxymethylfluorene, 9-(octylcarbonyl)-9'-pentoxymethylfluorene; 9-(i-octylcarbonyl)-9'-methoxymethylfluorene, 9-(i-octylcarbonyl)-9'-ethoxymethylfluorene, 9-(i-octylcarbonyl)-9'-propoxymethylfluorene, 9-(i-octylcarbonyl)-9'-butoxymethylfluorene, 9-(i-octylcarbonyl)-9'-pentoxymethylfluorene; 9-(i-nonylcarbonly)-9'-methoxymethylfluorene, 9-(i-nonylcarbonyl)-9'-ethoxymethylfluorene, 9-(i-nonylcarbonyl)-9'-propoxymethylfluorene, 9-(i-nonylcarbonyl)-9'-butoxymethylfluorene, 9-(i-nonylcarbonyl)-9'-pentoxymethylfluorene; 9-(2-ethyl-hexylcarbonyl)-9'-methoxymethylfluorene, 9-(2ethyl-hexylcarbonyl)-9'-ethoxymethylfluorene, 9-(2-ethyl-hexylcarbonyl)-9'-propoxymethylfluorene, 9-(2-ethyl-hexylcarbonyl)-9'-butoxymethylfluorene, 9-(phenylketone)-9'-methoxymethylfluorene, 9-(phenylketone-9'-ethoxymethylfluorene, 9-(phenylketone)-9'-propoxymethylfluorene, 9-(phenylketone)-9'-butoxymethylfluorene, 9-(phenylketone)-9'-pentoxymethylfluorene, 9-(4-methylphenylketone)-9'- methoxymethylfluorene, 9-(3-methylphenylketone)-9'-methoxymethylfluorene, 9-(2-methylphenylketone)-9'-methoxymethylfluorene.

Additional examples include: 1-(ethylcarbonyl)-1'-methoxymethylcyclopentane, 1-(propylcarbonyl)-1'-methoxymethylcyclopentane, 1-(i-propylcarbonyl)-1'-methoxymethylcyclopentane, 1-(butylcarbonyl)-1'-methoxymethylcyclopentane, 1-(i-butylcarbonyl)-1'-methoxymethylcyclopentane. 1-(pentylcarbonyl)-1'-methoxymethylcyclopentane, 1-(i-pentylcarbonyl)-1'-methoxymethylcyclopentane, 1-(neopentylcarbonyl)-1'-methoxymethylcyclopentane, 1-(hexhylcarbonyl)-1'-methoxymethylcyclopentane, 1-(2-ethylhexylcarbonyl)-1'-methoxymethylcyclopentane, 1-(octylcarbonyl)-1'-methoxymethylcyclopentane, 1-(i-octylcarbonyl)-1'-methoxymethylcyclopentane, 1-(i-nonylcarbonyl)-1'-methoxymethylcyclopentane. 1-(ethylcarbonyl)-1'-methoxymethyl-2-methylcyclopentane, 1-(propylcarbonyl)-1'-methoxymethyl-2-methylcyclopentane, 1-(i-propylcarbonyl)-1'-methoxymethyl-2methylcyclopentane, 1-(butylcarbonyl)-1'-methoxymethyl-2-methylcyclopentane, 1-(i-butylcarbonyl)-1'-methoxymethyl-2-methylcyclopentane. 1-(pentylcarbonyl)-1'-methoxymethyl-2-methylcyclopentane, 1-(i-pentylcarbonyl)-1 '-methoxymethyl-2-methylcyclopentane, 1-(neopentylcarbonyl)-1'-methoxymethyl-2-methylcyclopentane, 1-(hexhylcarbonyl)-1'-methoxymethyl-2-methylcyclopentane, 1-(2-ethylhexylcarbonyl)-1'-methoxymethyl-2-methyl cyclopentane, 1-(octylcarbonyl)-1'-methoxymethyl-2-methyl cyclopentane, 1-(i-octylcarbonyl)-1'-methoxymethyl-2-methyl cyclopentane, 1-(i-nonylcarbonyl)-1'-methoxymethyl-2-methyl cyclopentane, 1-(ethylcarbonyl)-1'-methoxymethyl-2,5-dimethylcyclopentane, 1-(propylcarbonyl)-1'-methoxymethyl-2,5-dimethylcyclopentane, 1-(i-propylcarbonyl)-1'-methoxymethyl-2,5-dimethylcyclopentane, 1-(butylcarbonyl)-1'-methoxymethyl-2,5-di-cyclopentane, 1-(i-butylcarbonyl)-1'-methoxymethyl-2,5-dimethylcyclopentane. 1-(pentylcarbonyl)-1'-methoxymethyl-2,5-dimethylcyclopentane, 1-(i-pentylcarbonyl)-1'-methoxymethyl-2,5-dimethylcyclopentane, 1-(neopentylcarbonyl)-1'-methoxymethyl-2,5-dimethylcyclopentane, 1-(hexhylcarbonyl)-1'-methoxymethyl-2,5-dimethylcyclopentane, 1-(2-ethylhexylcarbonyl)-1'-methoxymethyl-2,5-dimethyl cyclopentane, 1-(octylcarbonyl)-1'-methoxymethyl-2,5-dimethyl cyclopentane, 1-(i-octylcarbonyl)-1'-methoxymethyl-2,5-dimethyl cyclopentane, 1-(i-nonylcarbonyl)-1'-methoxymethyl-2,5-dimethyl cyclopentane, 1-(ethylcarbonyl)-1'-methoxymethylcyclohexane, 1-(propylcarbonyl)-1'-methoxymethylcyclohexane, 1-(i-propylcarbonyl)-1'-methoxymethylcyclohexane, 1-(butylcarbonyl)-1'-methoxymethylcyclohexyl, 1-(1-butylcarbonyl)-1'-methoxymethylcyclohexane. 1-(pentylcarbonyl)-1'-methoxymethylcyclohexane, 1-(i-pentylcarbonyl)-1'-methoxymethylcyclohexane, 1-(neopentylcarbonyl)-1'-methoxymethylcyclohexane, 1-(hexhylcarbonyl)-1'-methoxymethylcyclohexane, 1-(2-ethylhexylcarbonyl)-1'-methoxymethylcyclohexane, 1-(octylcarbonyl)-1'-methoxymethylcyclohexane, 1-(i-octylcarbonyl)-1'-methoxymethylcyclohexane, 1-(i-nonylcarbonyl)-1'-methoxymethylcyclohexane. 1-(ethylcarbonyl)-1'-methoxymethyl-2-methylcyclohexane, 1-(propylcarbonyl)-1'-methoxymethyl-2-methylcyclohexane, 1-(i-propanecarbonyl)-1'-methoxymethyl-2-methylcyclohexane, 1-(butylcarbonyl)-1'-methoxymethyl-2-methylcyclohexane, 1-(i-butylcarbonyl)-1'-methoxymethyl-2-methylcyclohexane. 1-(pentylcarbonyl)-1'-methoxymethyl-2-methylcyclohexane, 1-(i-pentylcarbonyl)-1'-methoxymethyl-2-methylcyclohexane, 1-(neopentylcarbonyl)-1'-methoxymethyl-2-methylcyclohexane, 1-(hexhylcarbonyl)-1'-methoxymethyl-2-methylcyclohexane, 1-(2-ethylhexylcarbonyl)-1'-methoxymethyl-2-methyl cyclohexane, 1-(octylcarbonyl)-1'-methoxymethyl-2-methyl cyclohexane, 1-(i-octylcarbonyl)-1'-methoxymethyl-2-methyl cyclohexane, 1-(i-nonylcarbonyl)-1'-methoxymethyl-2-methyl cyclohexane, 1-(ethylcarbonyl)-1'-methoxymethyl-2, 6-dimethylcyclohexane, 1-(propylcarbonyl)-1'-methoxymethyl-2,6-dimethylcyclohexane, 1-(i-propylcarbonyl)-1'-methoxymethyl-2,6-dimethyl-cyclohexane, 1-(butylcarbonyl)-1'-methoxymethyl-2,6-dimethyl-cyclohexane, 1-(i-butylcarbonyl)-1'-methoxymethyl-2,6-dimethylcyclohexane. 1-(pentylcarbonyl)-1'-methoxymethyl-2,6-dimethylcyclohexane, 1-(i-pentylcarbonyl)-1'-methoxymethyl-2,6-dimethylcyclohexane, 1-(neopentylcarbonyl)-1'-methoxymethyl-2, 6-dimethylcyclohexane, 1-(hexhylcarbonyl)-1'-methoxymethyl-2,6-dimethylcyclohexane, 1-(2-ethylhexylcarbonyl)-1'-methoxymethyl-2,6-dimethyl cyclohexane, 1-(octylcarbonyl)-1'-methoxymethyl-2,6-dimethyl cyclohexane, 1-(i-octylcarbonyl)-1'-methoxymethyl-2, 6-dimethyl cyclohexane, 1-(i-nonylcarbonyl)-l-methoxymethyl-2,6-dimethyl cyclohexane, 2,5-dimethyl-3-ethylcarbonyl-3'-methoxymethylpentane, 2,5-dimethyl-3-propylcarbonyl-3'-methoxymethylpentane, 2,5-dimethyl-3-propylcarbonyl-3'-methoxymethylpentane, 2,5-dimethyl-3-butylcarbonyl-3'-methoxymethylpentane, 2,5-dimethyl-3-i-butylcarbonyl-1'-methoxymethylcyclohexyl. 2,5-dimethyl-3-pentylcarbonyl-3 '-methoxymethylpentane, 2,5-dimethyl-3-i-pentylcarbonyl-3'-methoxymethylpentane, 2,5-dimethyl-3-neopentylcarbonyl-3'-methoxymethylpentane, 2,5-dimethyl-3-hexhylcarbonyl-3'-methoxymethylpentane, 2,5-dimethyl-3-2-ethylhexylcarbonyl-3'-methoxymethylpentane, 2,5-dimethyl-3-octylcarbonyl-3'-methoxymethylpentane, 2,5-dimethyl-3-i-octylcarbonyl-3'-methoxymethylpentane, and 2,5-dimethyl-3-i-nonylcarbonyl-3'-methoxymethylpentane.

In one embodiment, an internal electron donor is one or more selected from dialkyl-4-alkylphthalates including diisobutyl-4-methylphthalate and di-n-butyl-4-ethylphthalate; diisobutyl cyclopentane-1,1-dicarboxylate; and isobutyl 1-(methoxymethyl)cyclopentanecarboxylate.

Additional useful internal electron donors include 1,8-naphthyl diaryloate compounds that have three aryl groups connected by ester linkages (three aryl groups connected by two ester linkages, such as an aryl-ester linkage-naphthyl-ester linkage-aryl compound). 1,8-naphthyl diaryolate compounds can be formed by reacting a naphthyl dialcohol compound with an aryl acid halide compound. Methods of forming an ester product through reaction of an alcohol and acid anhydride are well known in the art.

While not wishing to be bound by any theory, it is believed that the 1,8-naphthyl diaryloate compounds have a chemical structure that permits binding to both a titanium compound and a magnesium compound, both of which are typically present in a solid titanium catalyst component of an olefin polymerization catalyst system. The 1,8-naphthyl diaryloate compounds also act as internal electron donors, owing to the electron donation properties of the compounds, in a solid titanium catalyst component of an olefin polymerization catalyst system.

In one embodiment, the 1,8-naphthyl diaryloate compounds are represented by chemical Formula IV:

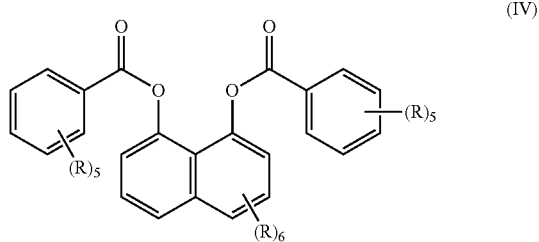

(IV)

wherein each R is independently hydrogen, halogen, alkyl having 1 to about 8 carbon atoms, phenyl, arylalkyl having 7 to about 18 carbon atoms, or alkylaryl having 7 to about 18 carbon atoms. In another embodiment, each R is independently hydrogen, alkyl having 1 to about 6 carbon atoms, phenyl, arylalkyl having 7 to about 12 carbon atoms, or alkylaryl having 7 to about 12 carbon atoms.

General examples of 1,8-naphthyl diaryloate compounds include 1,8-naphthyl di(alkylbenzoates); 1,8-naphthyl di(dialkylbenzoates); 1,8-naphthyl di(trialkylbenzoates); 1,8-naphthyl di(arylbenzoates); 1,8-naphthyl di(halobenzoates); 1,8-naphthyl di(dihalobenzoates); 1,8-naphthyl di(alkylhalobenzoates); and the like.

Specific examples of 1,8-naphthyl diaryloate compounds include 1,8-naphthyl dibenzoate; 1,8-naphthyl di-4-methylbenzoate; 1,8-naphthyl di-3-methylbenzoate; 1,8-naphthyl di-2-methylbenzoate; 1,8-naphthyl di-4-ethylbenzoate; 1,8-naphthyl di-4-n-propylbenzoate; 1,8-naphthyl di-4-isopropylbenzoate; 1,8-naphthyl di-4-n-butylbenzoate; 1,8-naphthyl di-4-isobutylbenzoate; 1,8-naphthyl di-4-t-butylbenzoate; 1,8-naphthyl di-4-phenylbenzoate; 1,8-naphthyl di-4-fluorobenzoate; 1,8-naphthyl di-3-fluorobenzoate; 1,8-naphthyl di-2-fluorobenzoate; 1,8-naphthyl di-4-chlorobenzoate; 1,8-naphthyl di-3-chlorobenzoate; 1,8-naphthyl di-2-chlorobenzoate; 1,8-naphthyl di-4-bromobenzoate; 1,8-naphthyl di-3-bromobenzoate; 1,8-naphthyl di-2-bromobenzoate; 1,8-naphthyl di-4-cyclohexylbenzoate; 1,8-naphthyl di-2,3-dimethylbenzoate; 1,8-naphthyl di-2,4-dimethylbenzoate; 1,8-naphthyl di-2,5-dimethylbenzoate; 1,8-naphthyl di-2,6-dimethylbenzoate; 1,8-naphthyl di-3,4-dimethylbenzoate; 1,8-naphthyl di-3,5-dimethylbenzoate; 1,8-naphthyl di-2,3-dichlorobenzoate; 1,8-naphthyl di-2,4-dichlorobenzoate; 1,8-naphthyl di-2,5-dichlorobenzoate; 1,8-naphthyl di-2,6-dichlorobenzoate; 1,8-naphthyl di-3,4-dichlorobenzoate; 1,8-naphthyl di-3,5-dichlorobenzoate; 1,8-naphthyl di-3,5-di-t-butylbenzoate; and the like.

In certain embodiments, the electron donor is dissolved in the solution in a ratio with the magnesium compound of 0.001:1 to 1.0:1 or 0.01:1 to 0.5:1 or 0.05:1 to 0.3:1.

A magnesium compound, an organic oxygenate and an organic compound containing a group V element are dissolved in at least one organic solvent to form a solution. An auxiliary precipitant is dissolved in the solution. A titanium compound is contacted with the solution to form a mixture containing the magnesium compound and the titanium compound. The mixture is maintained at a temperature of about 5° C. to about 35° C. for at least 2 hours. In particular embodiments, the mixture is maintained at a temperature of about 5° C. to about 35° C. for at least 4 hours. In yet further particular embodiments, the mixture is maintained at a temperature of about 5° C. to about 35° C. for at least 6 hours. In some embodiments, the mixture is maintained at a temperature of about 5° C. to about 35° C. for at least 2 and not more than 24 hours. In further embodiments, the mixture is maintained at a temperature of about 5° C. to about 35° C. for at least 4 hours and not more than 12 hours. In some embodiments, the mixture is maintained at a temperature of from about 5° C. to about 25° C. or from about 5° C. to about 15° C. or from about 5° C. to about 10° C. When the mixture is maintained at a temperature, it is meant that the temperature does not vary more than 1° C. during the time period. In certain embodiments, the temperature is not varied more than 0.5° C.

The temperature of the mixture is then increased to a temperature of about 40° C. to about 50° C. over a period of about 3 hours to about 10 hours. In some embodiments, the temperature of the mixture is increased to a temperature of about 40° C. to about 50° C. over a period of from about 3 hours to about 8 hours or from about 3 hours to about 6 hours or from about 3 hours to about 4 hours.

The temperature of the mixture is then increased to a temperature of about 80° C. to about 90° C. over a period of about 0.5 hour to about 3 hours. In some embodiments, the temperature of the mixture is increased to a temperature of about 80° C. to about 90° C. for from about 1 hour to about 2.5 hours or from about 0.5 hours to about 1 hour. The mixture after being heated to a temperature of about 80° C. to about 90° C. is washed with a second mixture of the titanium compound and at least one aromatic organic solvent.

Catalysts can be represented by their morphology. The three parameters of catalyst morphology (sphericity, symmetry and aspect ratio) collected by a Camsizer instrument are used to characterize the catalyst morphology.

Camsizer Characteristics:

$$\text{Sphericity } SPHT = \frac{4\pi A}{P^2} = \text{Circularity 2 (ISO 9276-6)}$$

P—measured perimeter/circumference of a particle projection

A—measured area covered by a particle projection

For an ideal sphere SPHT is expected to be as 1.

Otherwise it is smaller than 1.

$$\text{Symmetry } Symm_{0,3} = \frac{1}{2}\left(1 + \min\left(\frac{r_1}{r_2}\right)\right)$$

$r_1$ and $r_2$ are distances from the centre of area to the borders in the measuring direction. For asymmetric particles Symm is <1.

If the centre of area is outside the particle i.e.

$$\frac{r_1}{r_2} < 0$$

Symm is <0.5

$X_{Ma} = r_1 + r_2$ "Symm" is minimum value of measured set of symmetry values from different directions $$\text{Aspect ratio } b/l_{0,2,3} = \frac{x_{c\,min}}{x_{Fe\,max}}$$

$X_{c\,min}$ and $X_{Fe\,max}$ out of the measured set of $x_c$ and $x_{Fe}$ values The catalyst morphology characteristics such as sphericity, symmetry and aspect ratio characteristics are increased when a cold hold is added to the temperature ramp profile, followed by slow ramping. In some processes the sphericity, symmetry and aspect ratio are higher than 0.8, or higher than 0.85, or higher than 0.88, or higher than 0.90, or higher than 0.92, or higher than 0.95.

The solid catalyst component may be used after being diluted with an inorganic or organic compound such as a silicon compound, an aluminum compound, or the like.

The catalyst system may contain at least one organoaluminum compound in addition to the solid catalyst component. Compounds having at least one aluminum-carbon bond in the molecule can be used as the organoaluminum compound. Examples of organoaluminum compounds include compounds of the following chemical formula (V):

$$AlR_nX_{3-n} \qquad (V)$$

In formula (V), R independently represents a hydrocarbon group usually having 1 to about 20 carbon atoms, X represents halogen atoms, and $0 < n \leq 3$.

Specific examples of the organoaluminum compounds represented by formula (V) include, but are not limited to trialkyl aluminums such as triethyl aluminum, tributyl aluminum and trihexyl aluminum; trialkenyl aluminums such as triisoprenyl aluminum; dialkyl aluminum halides such as diethyl aluminum chloride, dibutyl aluminum chloride and diethyl aluminum bromide; alkyl aluminum sesquihalides such as ethyl aluminum sesquichloride, butyl aluminum sesquichloride and ethyl aluminum sesquibromide; alkyl aluminum dihalides such as ethyl aluminum dichloride, propyl aluminum dichloride and butyl aluminum dibromide; dialkyl aluminum hydrides such as diethyl aluminum hydride and dibutyl aluminum hydride; and other partially hydrogenated alkyl aluminum such as ethyl aluminum dihydride and propyl aluminum dihydride.

The organoaluminum compound can be used in the catalyst system in an amount that the mole ratio of aluminum to titanium (from the solid catalyst component) is from about 5 to about 1. In another embodiment, the mole ratio of aluminum to titanium in the catalyst system is from about 10 to about 700. In yet another embodiment, the mole ratio of aluminum to titanium in the catalyst system is from about 25 to about 400.

The catalyst system may contain at least one organosilicon compound in addition to the solid catalyst component. This organosilicon compound is sometimes termed as an external electron donor. The organosilicon compound contains silicon having at least one hydrogen ligand (hydrocarbon group). General examples of hydrocarbon groups include alkyl groups, cycloalkyl groups, (cycloalkyl)methylene groups, alkene groups, aromatic groups, and the like.

The organosilicon compound, when used as an external electron donor serving as one component of a Ziegler-Natta catalyst system for olefin polymerization, contributes to the ability to obtain a polymer (at least a portion of which is polyolefin) having a controllable molecular weight distribution and controllable crystalinity while retaining high performance with respect to catalytic activity.

The organosilicon compound is used in the catalyst system in an amount such that the mole ratio of the organoaluminum compound to the organosilicon compound is from about 2 to about 90. In another embodiment, the mole ratio of the organoaluminum compound to the organosilicon compound is from about 5 to about 70. In yet another embodiment, the mole ration of the organoaluminum compound to the organosilicon compound is from about 7 to about 35.

In one embodiment, the organosilicon compound is represented by chemical formula

$$R_nSi(OR')_{4-n} \qquad (VI)$$

wherein each R and R' independently represent a hydrocarbon group, and n is $0 \leq n < 4$.

Specific examples of the organosilicon compound of formula (VI) include, but are not limited to trimethylmethoxysilane, trimethylethoxysilane, dimethyldimethoxysilane, dimethyldiethoxysilane, diisopropyldimethoxysilane, diisobutyldimethoxysilane, t-butylmethyldimethoxysilane, t-butylmethyldiethoxysilane, t-amylmethyldiethoxysilane, dicyclopentyldimethoxysilane, diphenyldimethoxysilane, phenylmethyldimethoxysilane, diphenyldiethoxysilane, bis-o-tolydimethoxysilane, bis-m-tolydimethoxysilane, bis-p-tolydimethoxysilane, bis-p-tolydiethoxysilane, bisethylphenyldimethoxysilane, dicyclohexyldimethoxysilane, cyclohexylmethyldimethoxysilane, cyclohexylmethyldiethoxysilane, ethyltrimethoxysilane, ethyltriethoxysilane, vinyltrimethoxysilane, methyltrimethoxysilane, n-propyltriethoxysilane, decyltrimethoxysilane, decyltriethoxysilane, phenyltrimethoxysilane, gamma-chloropropyltrimethoxysilane, methyltriethoxysilane, ethyltriethoxysilane, vinyltriethoxysilane, t-butyltriethoxysilane, nbutyltriethoxysilane, iso-butyltriethoxysilane, phenyltriethoxysilane, gammaamniopropyltriethoxysilane, cholotriethoxysilane, ethyltriisopropoxysilane, vinyltirbutoxysilane, cyclohexyltrimethoxysilane, cyclohexyltriethoxysilane, 2-norbornanetrimethoxysilane, 2-norboranetriethoxysilane, 2-norboranemethyldimethoxysilane, ethyl silicate, butyl silicate, trimethylphenoxysilane, and methyltriallyloxysilane.

In another embodiment, the organosilicon compound is represented by chemical formula (VII):

$$SiRR'_m(OR'')_{3-m} \qquad (VII)$$

In the above formula (VII), $0 \leq m < 3$, such as $0 \leq m < 2$; and R independently represents a cyclic hydrocarbon or substituted cyclic hydrocarbon group. Specific examples of the group R include, but are not limited to cyclopropyl; cyclobutyl; cyclopentyl; 2-methylcyclopentyl; 3-methylcyclopentyl; 2-ethylcyclopentyl; 3-propylcyclopentyl; 3-isopropylcyclopentyl; 3-butylcyclopentyl; 3-tertiary butyl cyclopentyl; 2,2-dimethylcyclopentyl; 2,3-dimethylcyclopentyl; 2,5-dimethylcyclopentyl; 2,2,5-trimethylcyclopentyl; 2,3,4,5-tetramethylcyclopentyl; 2,2,5,5-tetramethylcyclopentyl; 1-cyclopentylpropyl; 1-methyl-1-cyclopentylethyl; cyclopentenyl; 2-cyclopentenyl; 3-cyclopentenyl; 2-methyl-1-cyclopentenyl; 2-methyl-3-cyclopentenyl; 3-methyl-3-cyclopentenyl; 2-ethyl-3-cyclopentenyl; 2,2-dimethyl-3-cyclopentenyl; 2,5-dimethyl-3-cyclopentenyl; 2,3,4,5-tetramethyl-3-cyclopentenyl; 2,2,5,5-tetramethyl-3-cyclopentenyl; 1,3-cyclopentadienyl; 2,4-cyclopentadienyl; 1,4-cyclopentadienyl; 2-methyl-1,3-cyclopentadienyl; 2-methyl-2,4-cyclopentadienyl; 3-methyl-2,4-cyclopentadienyl; 2-ethyl-2,4-cyclopentadienyl; 2,2-dimethyl-2,4-cyclopentadienyl; 2,3-dimethyl-2,4-cyclopentadienyl; 2,5-dimethyl-2,4-cyclopentadienyl; 2,3,4,5-tetramethyl-2,4-cyclopentadienyl; indenyl; 2-methylindenyl; 2-ethylindenyl; 2-indenyl; 1-methyl-2-indenyl; 1,3-dimethyl-2-indenyl; indanyl; 2-methylindanyl; 2-indanyl; 1,3-dimethyl-2-indanyl; 4,5,6,7-tetrahydroindenyl; 4,5,6,7-tetrahydro-2-indenyl; 4,5,6,7-tetrahydro-1-methyl-2-indenyl; 4,5,6,7-tetrahydro-1,3-dimethyl-2-indenyl; fluorenyl groups; cyclohexyl; methylcyclohexyls; ethylcylcohexyls; propylcyclohexyls; isopropylcyclohexyls; n-butylcyclohexyls; tertiary-butyl cyclohexyls; dimethylcyclohexyls; and trimethylcyclohexyls.

In formula (VII), R' and R" are identical or different and each represents a hydrocarbon. Examples of R' and R" are alkyl, cycloalkyl, aryl and aralkyl groups having 3 or more carbon atoms. Furthermore, R and R' may be bridged by an alkyl group, etc. General examples of organosilicon compounds are those of formula (VII) in which R is cyclopentyl group, R' is an alkyl group such as methyl or cyclopentyl group, and R" is an alkyl group, particularly a methyl or ethyl group.

Specific examples of organosilicon compounds of formula (VII) include, but are not limited to trialkoxysilanes such as cyclopropyltrimethoxysilane, cyclobutyltrimethoxysilane, cyclopentyltrimethoxysilane, 2-methylcyclopentyltrimethoxysilane, 2,3-dimethylcyclopentyltrimethoxysilane, 2,5-dimethylcyclopentyltrimethoxysilane, eye lopentyltriethoxysilane, cyclopentenyltrimethoxysilane, 3-cyclopentenyltrimethoxysilane, 2,4-cyclopentadienyltrimethoxysilane, indenyltrimethoxysilane and fluorenyltrimethoxysilane; dialkoxysilanes such as dicyclopentyldimethoxysilane, bis(2-methylcyclopentyl)dimethoxysilane, bis(3-tertiary butylcyclopentyl)dimethoxysilane, bis(2,3-dimethylcyclopentyl)dimethoxysilane, bis(2,5-dimethylcyclopentyl)dimethoxysilane, dicyclopentyldiethoxysilane, dicyclobutyldiethoxysilane, cyclopropylcyclobutyldiethoxysilane, dicyclopentenyldimethoxysilane, di(3-cyclopentenyl)dimethoxysilane, bis(2,5-dimethyl-3-cyclopentenyl)dimethoxysilane, di-2,4-cyclopentadienyl)dimethoxysilane, bis(2,5-dimethyl-2,4-cyclopentadienyl)dimethoxysilane, bis(1-methyl-1-cyclopentylethyl)dimethoxysilane, cyclopentylcyclopentenyldimethoxysilane, cyclopentylcyclopentadienyldimethoxysilane, diindenyldimethoxysilane, bis(1,3-dimethyl-2-indenyl)dimethoxysilane, cyclopentadienylindenyldimethoxysilane, difluorenyldimethoxysilane, cyclopentylfluorenyldimethoxysilane and indenylfluorenyldimethoxysilane; monoalkoxysilanes such as tricyclopentylmethoxysilane, tricyclopentenylmethoxysilane, tricyclopentadienylmethoxysilane, tricyclopentylethoxysilane, dicyclopentylmethylmethoxysilane, dicyclopentylethylmethoxysilane, dicyclopentylmethylethoxysilane, cyclopentyldimethylmethoxysilane, cyclopentyldiethylmethoxysilane, cyclopentyldimethylethoxysilane, bis(2,5-dimethylcyclopentyl)cyclopentylmethoxysilane, dicyclopenty lcyclopentenylmethoxysilane, dicyclopentylcyclopentenadienylmethoxysilane and diindenylcyclopentylmethoxysilane; and ethylenebis-cyclopentyldimethoxysilane.

Polymerization of olefins can be carried out in the presence of the catalyst system described above. Generally speaking, olefins are contacted with the catalyst system described above under suitable conditions to form desired polymer products. In one embodiment, preliminary polymerization described below is carried out before the main polymerization. In another embodiment, polymerization is carried out without preliminary polymerization. In yet another embodiment, the formation of copolymer is carried out using at least two polymerization zones.

In preliminary polymerization, the solid catalyst component is usually employed in combination with at least a portion of the organoaluminum compound. This may be carried out in the presence of part or the whole of the organosilicon compound (external electron donor compound). The concentration of the catalyst system used in the preliminary polymerization may be much higher than that in the reaction system of the main polymerization.

In preliminary polymerization, the concentration of the solid catalyst component in the preliminary polymerization is usually from about 0.01 to about 200 millimoles, or from about 0.05 to about 100 millimoles, calculated as titanium atoms per liter of an inert hydrocarbon medium described below. In one embodiment, the preliminary polymerization is carried out by adding an olefin and the above catalyst system ingredients to an inert hydrocarbon medium and polymerizing the olefin under mild conditions.

Specific examples of the inert hydrocarbon medium include, but are not limited to aliphatic hydrocarbons such as propane, butane, pentane, hexane, heptanes, octane, decane, dodecane and kerosene; alicyclic hydrocarbons such as cyclopentane, cyclohexane and methylcyclopentane; aromatic hydrocarbons such as benzene, toluene and xylene; and mixtures thereof. In certain embodiments, a liquid olefin may be used in place of part or the whole of the inert hydrocarbon medium.

The olefin used in the preliminary polymerization may be the same as, or different from, an olefin to be used in the main polymerization.

The reaction temperature for the preliminary polymerization is sufficient for the resulting preliminary polymer to not substantially dissolve in the inert hydrocarbon medium. In one embodiment, the temperature is from about −20 degrees Celsius to about 100 degrees Celsius. In another embodiment, the temperature is from about −10 degrees Celsius to about 80 degrees Celsius. In yet another embodiment, the temperature is from about 0 degrees Celsius to about 40 degrees Celsius.

Optionally, a molecular-weight controlling agent, such as hydrogen, may be used in the preliminary polymerization. The molecular weight controlling agent is used in such an amount that the polymer obtained by the preliminary polymerization has an intrinsic viscosity, measured in decaliter at 135 degrees Celsius, of at least about 0.2 dl/g, or from about 0.5 to 10 dl/g.

In one embodiment, the preliminary polymerization is carried out so that from about 0.1 g to about 1,000 g of a polymer is formed per gram of the solid catalyst component of the catalyst system. In another embodiment, the preliminary polymerization is carried out so that from about 0.3 g to about 500 g of a polymer is formed per gram of the solid catalyst component. If the amount of the polymer formed by the preliminary polymerization is too large, the efficiency of producing the olefin polymer in the main polymerization may sometimes decrease, and when the resulting olefin polymer is molded into a film or another article, fish eyes tend to occur in the molded article. The preliminary polymerization may be carried out batchwise or continuously.

After the preliminary polymerization conducted as above, or without performing any preliminary polymerization, the main polymerization of an olefin is carried out in the presence of the above-described olefin polymerization catalyst system formed from the solid catalyst component, the organoaluminum compound and the organosilicon compound (external electron donor compound).

Examples of olefins that can be used in the main polymerization are alpha-olefins having 2 to 20 carbon atoms such as ethylene, propylene, 1-butene, 4-methyl-1-pentene, 1-pentene, 1-octene, 1-hexene, 3-methyl-1-pentene, 3-methyl-1-butene, 1-decene, 1-tetradecene, 1-eicosene, and vinylcyclohexane. In exemplary processes, these alpha-olefins may be used individually or in any combination.

In one embodiment, propylene or 1-butene is homopolymerized, or a mixed olefin containing propylene or 1-butene as a main component is copolymerized. When the mixed olefin is used, the proportion of propylene or 1-butene as the main component is usually at least about 50 mole %, or at least about 70 mole %.

By performing the preliminary polymerization, the catalyst system in the main polymerization can be adjusted in the degree of activity. This adjustment tends to result in a powdery polymer having a high bulk density. Furthermore, when the preliminary polymerization is carried out, the particles shape of the resulting polymer becomes spherical, and in the case of slurry polymerization, the slurry attains excellent characteristics while in the case of gas phase polymerization, the polymer seed bed attains excellent characteristics. Furthermore, in these embodiments, a polymer having a high stereoregularity index can be produced with a high catalytic efficiency by polymerizing an alpha-olefin having at least 3 carbon atoms. Accordingly, when producing the propylene copolymer, the resulting copolymer powder or the copolymer becomes easy to handle.

In the homopolymerization of these olefins, a polyunsaturated compound such as conjugated diene or non-conjugated diene may be used as a comonomer. Examples of comonomers include styrene, butadiene, acrylonitrile, acrylamide, alpha-methyl styrene, chlorostyrene, vinyl toluene, divinyl benzene, diallyphthalate, alkyl methacrylates and alkyl acrylates. In one embodiment, the comonomers include thermoplastic and elastomeric monomers. The main polymerization of an olefin is carried out usually in the gaseous or liquid phase. In one embodiment, polymerization (main polymerization) employs a catalyst system containing the solid catalyst component in an amount from about 0.001 to about 0.75 millimoles calculated as Ti atom per liter of the volume of the polymerization zone, the organoaluminum compound in an amount from about 1 to about 2,000 moles per mole of titanium atoms in the solid catalyst component, and the organosilicon compound in an amount from about 0.001 to about 10 moles calculated as Si atoms in the organosilicon compound per mole of the metal atoms in the organoaluminum compound. In another embodiment, polymerization employs a catalyst system containing the solid catalyst component in an amount of from 0.005 to about 0.5 milimoles calculated as Ti atom per liter of the volume of the polymerization zone, the organoaluminum compound in an amount from about 5 to about 500 moles per mole of titanium atoms in the solid catalyst component, and the organosilicon compound in an amount from about 0.01 to about 2 moles calculated as Si atoms in the organosilicon compound per mole of the metal atoms in the organoaluminum compound. In yet another embodiment, polymerization employs a catalyst system containing the alkyl benzoate derivative in an amount from about 0.005 to about 1 mole calculated as Si atoms in the organosilicon compound per mole of the metal atoms in the organoaluminum compound.

When the organoaluminum compound and the organosilicon compound are used partially in the preliminary polymerization, the catalyst system subjected to the preliminary polymerization is used together with the remainder of the catalyst system components. The catalyst system subjected to the preliminary polymerization may contain the preliminary polymerization product.

The use of hydrogen at the time of polymerization promotes and contributes to control of the molecular weight of the resulting polymer, and the polymer obtained may have a high melt flow rate. In this case, the stereoregularity index of the resulting polymer and the activity of the catalyst system can be increased according to the above methods.

In one embodiment, the polymerization temperature is from about 20 degree Celsius to about 200 degrees Celsius. In another embodiment, the polymerization temperature is from about 50 degree Celsius to about 180 degrees Celsius. In one embodiment, the polymerization pressure is typically from atmospheric pressure to about 100 kg/cm$^2$. In another embodiment, the polymerization pressure is typically from about 2 kg/cm$^2$ to about 50 kg/cm$^2$. The main polymerization may be carried out batchwise, semi-continuously or continuously. The polymerization may also be carried out in two or more stages under different reaction conditions.

The olefin polymer so obtained may be a homopolymer, a random copolymer, a block copolymer or an impact copolymer. The impact copolymer contains an intimate mixture of a polyolefin homopolymer and a polyolefin rubber. Examples of polyolefin rubbers include ethylene propylene rubber (EPR) such as ethylene propylene methylene copolymer rubber (EPM) and ethylene propylene diene methylene terpolymer rubber (EPDM).

The olefin polymer obtained by using the catalyst system has a very small amount of an amorphous polymer component and therefore a small amount of a hydrocarbon-soluble component. Accordingly, a film molded from the resultant polymer has low surface tackiness.

The polyolefin obtained by the polymerization process is excellent in particle size distribution, particle diameter and bulk density, and the copolyolefin obtained has a narrow composition distribution. In an impact copolymer, excellent fluidity, low temperature resistance, and a desired balance between stiffness and elasticity can be obtained.

In one embodiment, propylene and an alpha-olefin having 2 or from about 4 to about 20 carbon atoms are copolymerized in the presence of the catalyst system described above. The catalyst system may be one subjected to the preliminary polymerization described above. In another embodiment, propylene and an ethylene rubber are formed in two reactors coupled in series to form an impact polymer.

The alpha-olefin having 2 carbon atoms is ethylene, and examples of the alpha-olefin having about 4 to about 20 carbon atoms are 1-butene, 1-pentene, 4-methyl-1-pentene, 1-octene, 1-hexene, 3-methyl-1-pentene, 3-methyl-1-butene, 1-decene, vinylcyclohexane, 1-tetradecene, and the like.

In the main polymerization, propylene may be copolymerized with two or more such alpha-olefins. For example, it is possible to copolymerize propylene with ethylene and 1-butene. In one embodiment, propylene is copolymerized with ethylene, 1-butene or ethylene and 1-butene.

Block copolymerization of propylene and another alpha-olefin may be carried out in two stages. The polymerization in a first stage may be the homopolymerization of propylene or the copolymerization of propylene with the other alpha-olefin. In one embodiment, the amount of the monomers polymerized in the first stage is from about 50 to about 95% by weight. In another embodiment, the amount of the monomers polymerized in the first stage is from about 60 to about 90% by weight. This first stage polymerization may be carried out in two or more stages under the same or different polymerization conditions.

In one embodiment, the polymerization in a second stage is carried out such that the mole ratio of propylene to the other alpha-olefin(s) is from about 10/90 to about 90/10. In another embodiment, the polymerization in a second stage is carried out such that the mole ratio of propylene to the other alpha-olefin(s) is from about 20/80 to about 80/20. In yet another embodiment, the polymerization in a second stage is carried out such that the mole ratio of propylene to the other alpha-olefin(s) is from about 30/70 to about 70/30. Producing a crystalline polymer or copolymer of another alpha-olefin may be provided in the second polymerization stage.

The propylene copolymer so obtained may be a random copolymer or the above described block copolymer. This propylene copolymer can contain from about 7 to about 50 mole % of units derived from the alpha-olefin having 2 or from about 4 to about 20 carbon atoms. In one embodiment, a propylene random copolymer contains from about 7 to about 20 mole % of units derived from the alpha-olefin having 2 or from about 4 to about 20 carbon atoms. In another embodiment, the propylene block copolymer contains from about 10 to about 50 mole % of units derived from the alpha-olefin having 2 or 4-20 carbon atoms.

In another embodiment, copolymers made with the catalyst system contain from about 50% to about 99% by weight poly-alpha-olefins and from about 1 % to about 50% by weight comonomers (such as thermoplastic or elastomeric monomers). In another embodiment, copolymers made with the catalyst system contain from about 75% to about 98% by weight poly-alpha-olefins and from about 2% to about 25% by weight comonomers.

It should be understood that where there is no reference to the polyunsaturated compound that can be used, the method of polymerization, the amount of the catalyst system and the polymerization conditions, the same description as the above embodiment are applicable.

In one embodiment, the catalyst efficiency (measured as kilogram of polymer produced per gram of catalyst) of the catalyst system is at least about 30. In another embodiment, the catalyst efficiency of the catalyst system is at least about 60.

The catalysts/methods discussed above can in some instances lead to the production of poly-alpha-olefins having melt flow indexes (MFI) from about 0.1 to about 100. The MFI is measured according to ASTM standard D1238. In another embodiment, poly-alpha-olefins having an MFI from about 5 to about 30 are produced. In one embodiment, an impact polypropylene-ethylenepropylene rubber product has an MFI from about 4 to about 10. In another embodiment, an impact polypropyleneethylenepropylene rubber product has an MFI from about 5 to about 9. In some instances a relatively high MFI indicates relatively high catalyst efficiency is obtainable.

The catalysts/methods described above can in some instances lead to the production of poly-alpha-olefins having bulk densities (BD) of at least about 0.3 cc/g. In another embodiment, poly-alpha-olefins having a BD of at least about 0.4 cc/g are produced.

In one embodiment, an impact polypropylene-ethylenepropylene rubber product having a BD of at least about 0.3 cc/g is produced. In another embodiment, an impact polypropylene-ethylenepropylene rubber product having a BD of at least about 0.4 cc/g is produced.

The catalysts/methods described above can lead to the production of poly-alphaolefins having a relatively narrow molecular weight distribution. Polydispersive Index (PI) is strictly connected with the molecular weight distribution of the polymer. PI is calculated as the weight average molecular weight divided by the number average molecular weight, PI=Mw/Mn. In one embodiment, the PI of a polypropylene polymer made with the catalyst system is from about 2 to about 12. In another embodiment, the PI of a polypropylene polymer made with the catalyst system is from about 5 to about 11.

Embodiments of the present invention can lead to the production of a propylene block copolymer and impact copolymers including polypropylene based impact copolymer having one or more excellent melt-flowability, moldability, desirable balance between rigidity and elasticity, good stereospecific control, good control over polymer particle size, shape, size distribution, and molecular weight distribution, and impact strength with a high catalytic efficiency and/or good operability. Employing the catalyst systems containing the solid catalyst component according to embodiments of the present invention yields catalysts simultaneously having high catalytic efficiency, and one or more of excellent melt-flowability, extrudability, moldability, rigidity, elasticity and impact strength.

When making an impact copolymer, polypropylene can be formed in a first reactor while an ethylene propylene rubber can be formed in a second reactor. In this polymerization, the ethylene propylene rubber in the second reactor is formed with the matrix (and particularly within the pores) of the polypropylene formed in the first reactor. Consequently, an intimate mixture of an impact copolymer is formed, wherein the polymer product appears as a single polymer product. Such an intimate mixture cannot be made by simply mixing a polypropylene product with an ethylene propylene rubber product. The systems and reactors can be controlled, optionally with feedback based on continuous or intermittent testing, using a processor equipped with an optional memory and controllers. For example, a processor may be connected to one or more of the reactors, inlets, outlets, testing/measuring systems coupled with the reactors, and the like to monitor and/or control the polymerization process, based on preset data concerning the reactions, and/or based on testing/measuring data generated during a reaction. The controller may control valves, flow rates, the amounts of materials entering the systems, the conditions (temperature, reaction time, pH, etc.) of the reactions, and the like, as instructed by the processor. The processor may contain or be coupled to a memory that contains data concerning various aspects of the polymerization process. With respect to any figure or numerical range for a given characteristic, a figure or a parameter from one range may be combined with another figure or a parameter from a different range for the same characteristic to generate a numerical range. Other than in the operating examples, or where otherwise indicated, all numbers, values and/or expressions referring to quantities of ingredients, reaction conditions, etc., used in the specification and claims are to be understood as modified in all instances by the term "about."

The following examples illustrate embodiments of the present invention. Unless otherwise indicated in the following examples and elsewhere in the specification and claims, all parts and percentages are by weight, all temperatures are in degrees Celsius, and pressure is at or near atmospheric.

The inventors discovered that temperature holding and ramping affects the sphericity of catalyst particles.

Examples 1-20 demonstrate the effect of temperature ramping and holding on catalyst particle sphericity and morphology.

Example 1 and Comparative Example 1

Preparation of a Solid Titanium Catalyst

The catalyst was prepared by the following method. A mixture (29 g Toluene, 3.3 g epichlorohydrin (EPI), and 8.58 g tributylphosphate (TBP)) and 3.3 g $MgCl_2$ were transferred to 250 mL reactor. The mixture was heated and agitated at 60° C. at 400 rpms for 5 hours. Toluene (34 g) was added and the mixture was heated to 60° C. and agitated at 400 rpms. Phthalic anyhydride (PA) (0.97 g) was added to the reactor at 60° C. and the mixture was stirred for 1 hour. The mixture was cooled down to −28° C. reactor temperature. The agitation was maintained at 400 rpms. The first one-third of $TiCl_4$ (23.6 g) was slowly added to the reactor maintaining the reaction temperature at −25° C. Then, the second two-thirds of $TiCl_4$ (47.1 g) was added rapidly to the reaction mixture maintaining at −25° C. The agitation rate was lowered to 200 rpms.

The reaction temperature was then ramped from −25° C. to 25° C. in 1 hour 45 minutes, 25° C. to 45° C. in 1 hour 30 minutes and 45° C. to 85° C. in 30 min. At 80° C., Diisooctylphthalate (DIOP) (0.70 g) was added and the mixture was stirred for 1 hour at 85° C. at 200 rpms. The heating and agitator were turned off and the reaction mixture was filtered. 10% TiCl$_4$/Toluene (60 ml) was then added to the reactor and the mixture was heated to 80° C. at 400 rpms. At 80° C., DIOP (1.77 g) was added to the reactor and the mixture was stirred at 80° C. for 1 hour at 400 rpms. The heating and agitator were turned off and the reaction mixture was filtered. The solids were washed twice with 60 ml toluene agitating at 400 rpms for 10 min. A 10 vol % TiCl$_4$/toluene (66 ml) and DIOP (1.32 g) was transferred into the reactor and the mixture was mixed at 95° C. for 1 hour at 400 rpms. The agitation was turned off and the mixture was filtered. A 10 vol % TiCl$_4$/toluene (66 ml) was transferred into the reactor and the mixture was stirred at 110° C. for 30 minutes at 400 rpms. The agitation was turned off and the mixture was filtered. A 10 vol % TiCl$_4$/toluene (66 ml) was transferred into the reactor and the mixture was stirred at 110° C. for 30 minutes at 400 rpms. The agitation was turned off and the mixture was filtered. A 10 vol % TiLC$_4$/toluene (66 ml) was transferred into the reactor and the mixture was stirred at 38° C. for 5 minutes at 400 rpms. The agitation was turned off and the mixture was filtered. The jacket temperature was lowered to 65° C. and solids were washed with 40 ml hexane four times (10 min each).

Figure 1B:
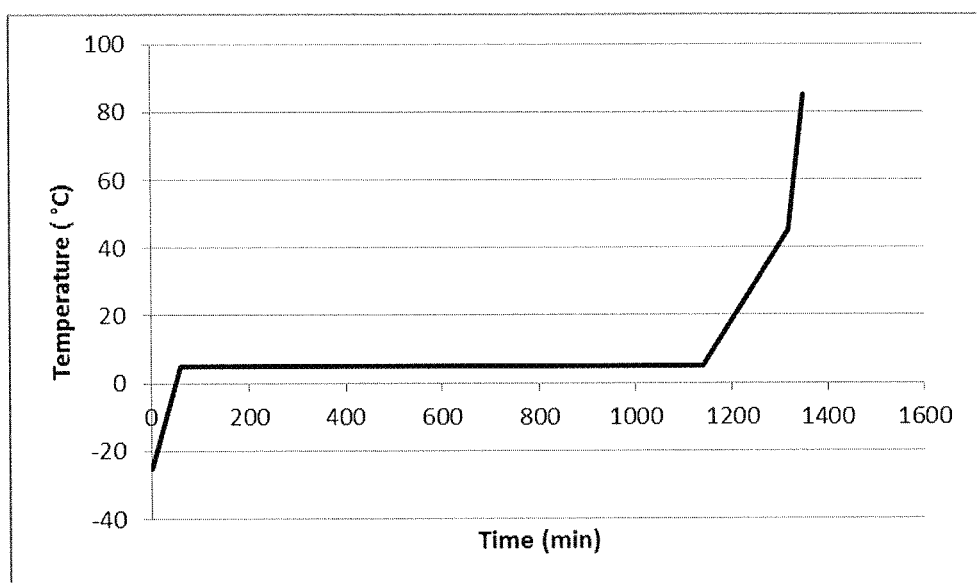
FIG. 1B shows the temperature ramp profile for Example 1.
Figure 2:
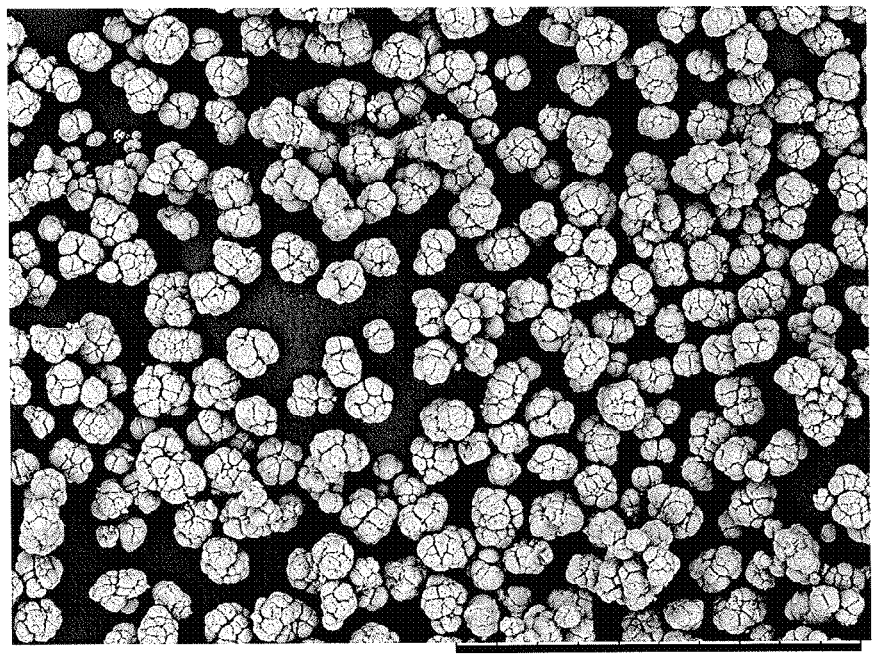
FIG. 2 shows a scanning electron micrograph (SEM) of the catalyst of Comparative Example 1.
Figure 3:
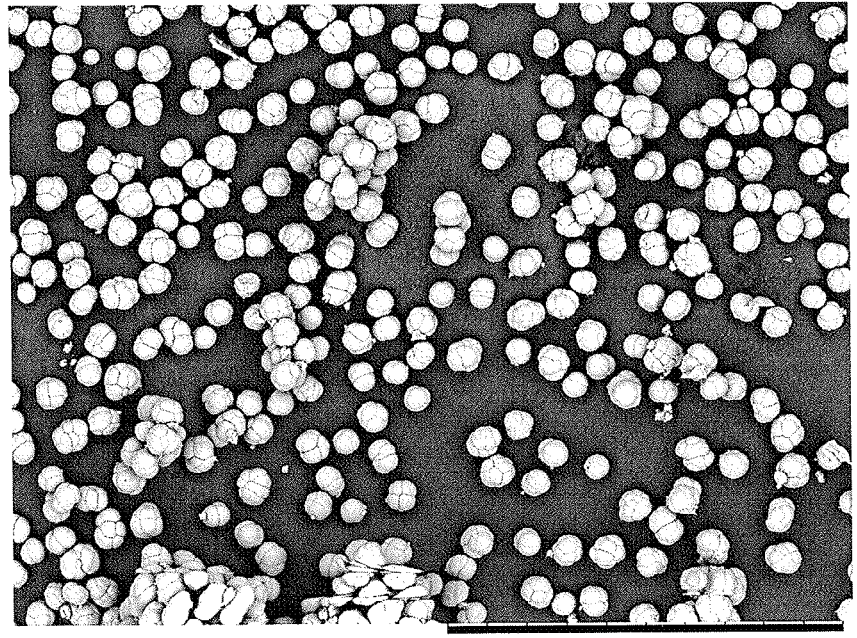
FIG. 3 shows a SEM of the catalyst of Example 1.

FIG. 1A shows a temperature ramp profile according to Comparative Example 1, in which there is no cold hold. Instead, the temperature according to Comparative Example 1 is increased from −20° C. to 85° C., without any periods of time in which the temperature is held steady. In Comparative Example 1, the temperature is increased from −20 C to 25 C in about 105 minutes. The temperature is then increased from 25 C to 45 C in about 90 minutes. The temperature is then increased from 45 C to 85 C in about 30 minutes. FIG. 1B shows a temperature ramp profile according to Example 1 corresponding to an embodiment of the invention. In Example 1, the temperature is increased from −20° C. to 5° C. in 60 minutes. The temperature is held at 5° C. for about 1000 minutes. The temperature is then increased from 5° C. to 45° C. in about 180 minutes. The temperature is then increased from 45° C. to 85° C. in about 30 minutes. A SEM picture of the catalyst produced according to Comparative Example 1 is shown in FIG. 2. A SEM picture of the catalyst produced according to Example 1 is shown in FIG. 3. The particles in FIG. 3 have a diameter of 30 microns.

Example 2

Figure 4:
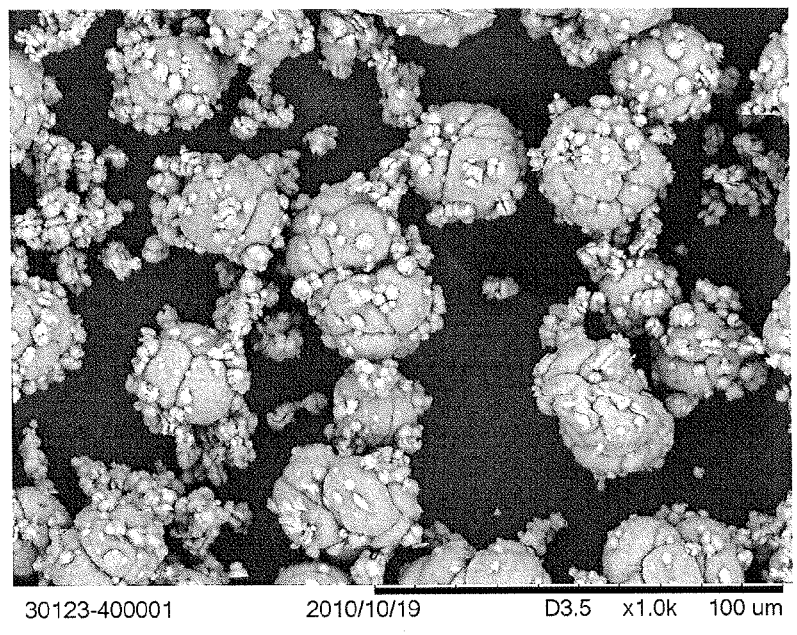
FIG. 4 shows a SEM of the catalyst of Example 2.
Figure 5A:
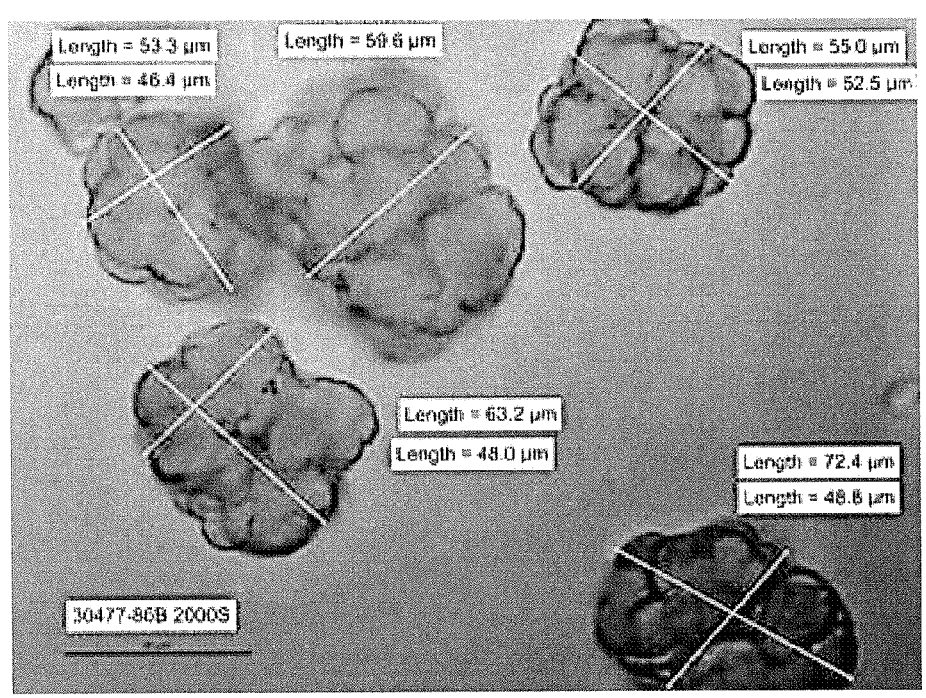
FIG. 5A shows a microscope picture of the catalyst of Example 3.
Figure 5B:
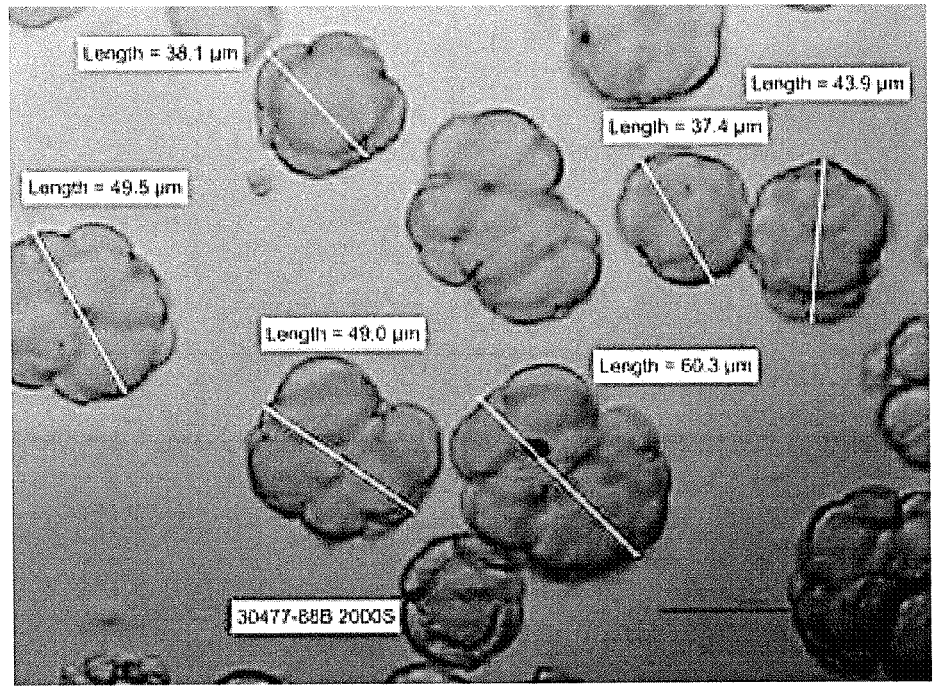
FIG. 5B shows a microscope picture of the catalyst of Example 4.
Figure 5C:
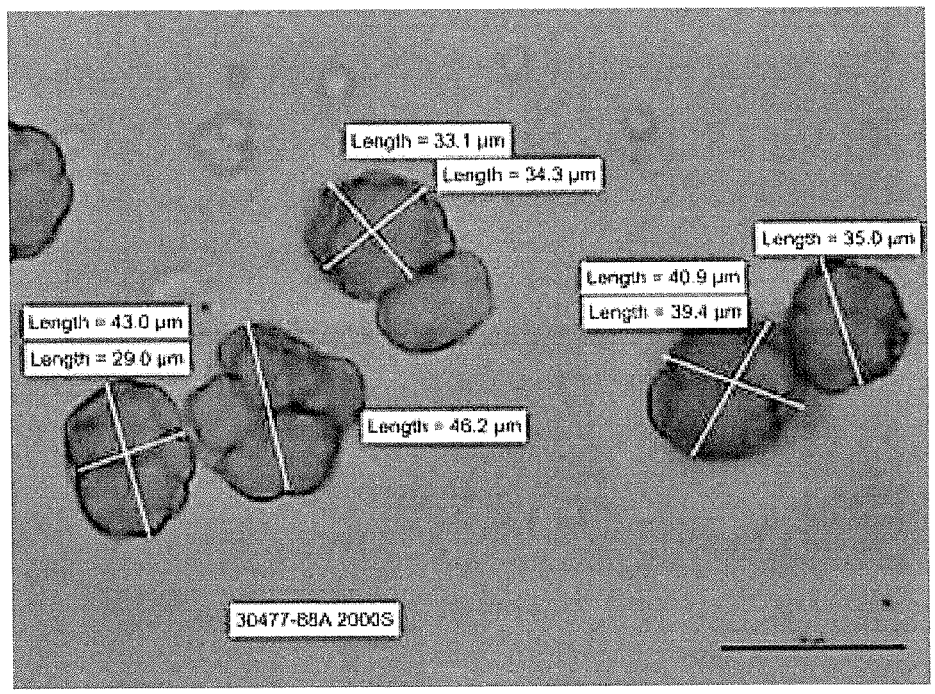
FIG. 5C shows a microscope picture of the catalyst of Example 5.
Figure 5D:
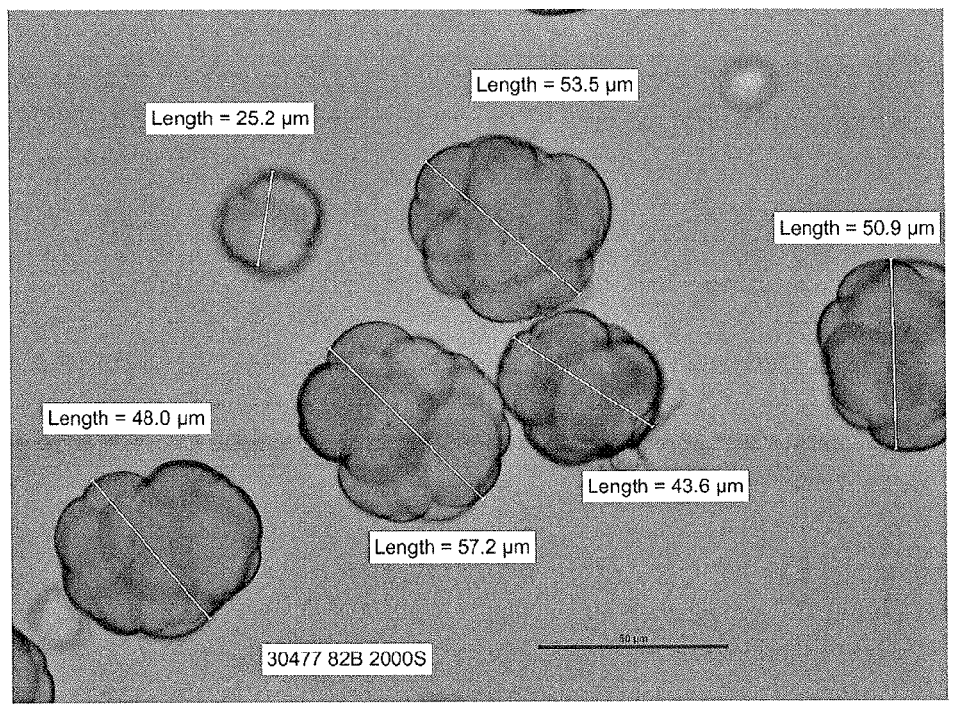
FIG. 5D shows a microscope picture of the catalyst of Example 6.

Example 1 was repeated except that the precipitation ramping profile was −10° C. to 5° C. The temperature was held at 5° C. overnight, followed by a ramp from 5° C. to 35° C. in 15 min, and a ramp from 35° C. to 85° C. in 15 min. The resulting catalyst particles are shown in FIG. 4.

Comparative Example 2 and Examples 3-6 Effect of Length of Cold Hold on Catalyst Morphology The catalyst was prepared as described in Example 1, except that the holding time was varied as shown in Table 1. The catalyst was tested for polypropylene polymerization and the particle morphology was measured by both microscope and Retsch Camsizer. SEM photomicrographs of the resulting catalyst particles of Examples 3-6 are shown in FIGS. 5A-5D and 6C-6D.

Polymer Morphology Characterization

The polymer samples are characterized by Camsizer instrument. Because PP morphology represents the catalyst morphology, the three parameters of PP morphology (sphericity, symmetry and aspect ratio) collected by Camsizer instrument were used to characterize PP and, therefore, the catalyst morphology.

Camsizer Characteristics:

$$\text{Sphericity } SPHT = \frac{4\pi A}{P^2} = \text{Circularity2 (ISO 9276-6)}$$

P—measured perimeter/circumference of a particle projection

A—measured area covered by a particle projection

For an ideal sphere SPHT is expected to be as 1. Otherwise it is smaller than 1.

$$\text{Symmetry } Symm_{0,3} = \frac{1}{2}\left(1 + \min\left(\frac{r_1}{r_2}\right)\right)$$

$r_1$ and $r_2$ are distances from the centre of area to the borders in the measuring direction. For asymmetric particles Symm is <1.

If the centre of area is outside the particle i.e.

$$\frac{r_1}{r_2} < 0$$

Symm is <0.5

$x_{Ma} = r_1 + r_2$ "Symm" is minimum value of measured set of symmetry values from different directions $$\text{Aspect ratio } b/l_{0,2,3} = \frac{x_{c\ min}}{x_{Fe\ max}};$$

$x_{e\ min}$ and $X_{Fe\ max}$ out of the measured set of $x_e$ and $X_F$, values Note:

$$\text{Span} = \frac{D[v, 0.9] - D[v, 0.1]}{D[v, 0.5]}$$

As may be seen in the results in Table 1 below, overall catalyst shape improves by holding the cold for longer times. The catalyst particles become more spherical as the cold hold time increases, i.e. SPHT3 increases. The subunit or non-spherical element extending from the particles becomes more distinct at shorter hold times, and thus the particles become more bulgy and less spherical.

TABLE 1

Catalyst and Polymer morphology

| Example | hold h | D50μ | Span | Poly d50μ | Span | SPHT3 | Symm3 | B/l3 |
|---|---|---|---|---|---|---|---|---|
| Comparative Example 2 | 0 | 38.4 | 0.95 | 2128 | 0.45 | 0.86 | 0.89 | 0.76 |
| Example 3 | 2 | 45.7 | 0.78 | 2114 | 0.44 | 0.88 | 0.90 | 0.77 |
| Example 4 | 4 | 35.8 | 0.91 | 1566 | 0.49 | 0.88 | 0.89 | 0.76 |
| Example 5 | 6 | 43.0 | 0.81 | 1736 | 0.47 | 0.91 | 0.92 | 0.80 |
| Example 6 | 12 | 42.6 | 0.86 | 1739 | 0.43 | 0.93 | 0.92 | 0.81 |

Figure 6A:
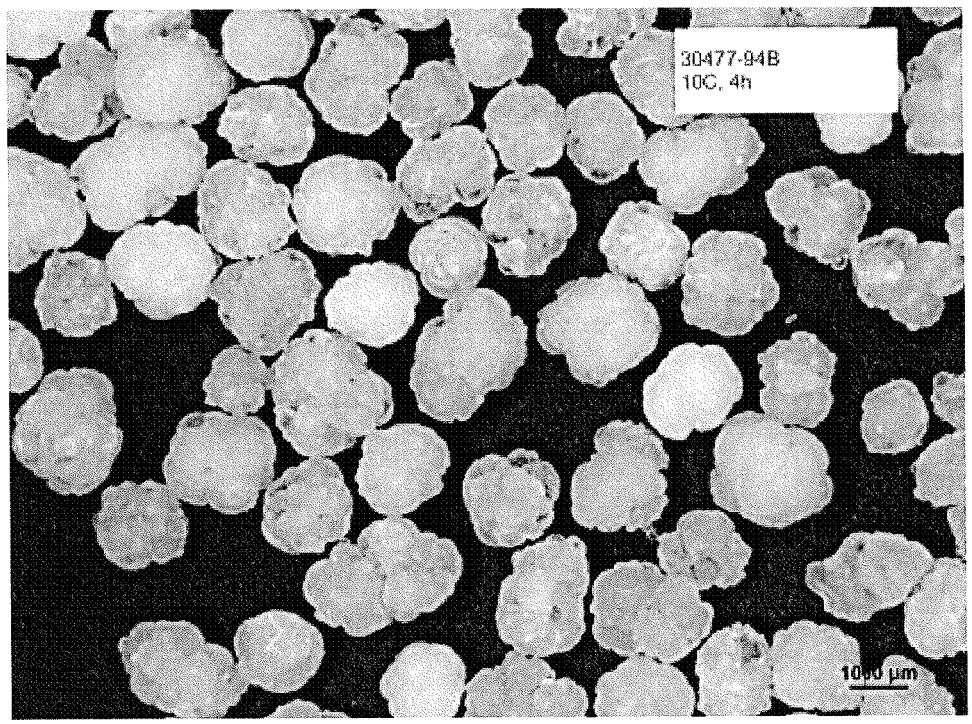
FIG. 6A shows a microscope picture of the polymer of Example 9.
Figure 6B:
FIG. 6B shows a microscope picture of the polymer of Example 10.
Figure 6C:
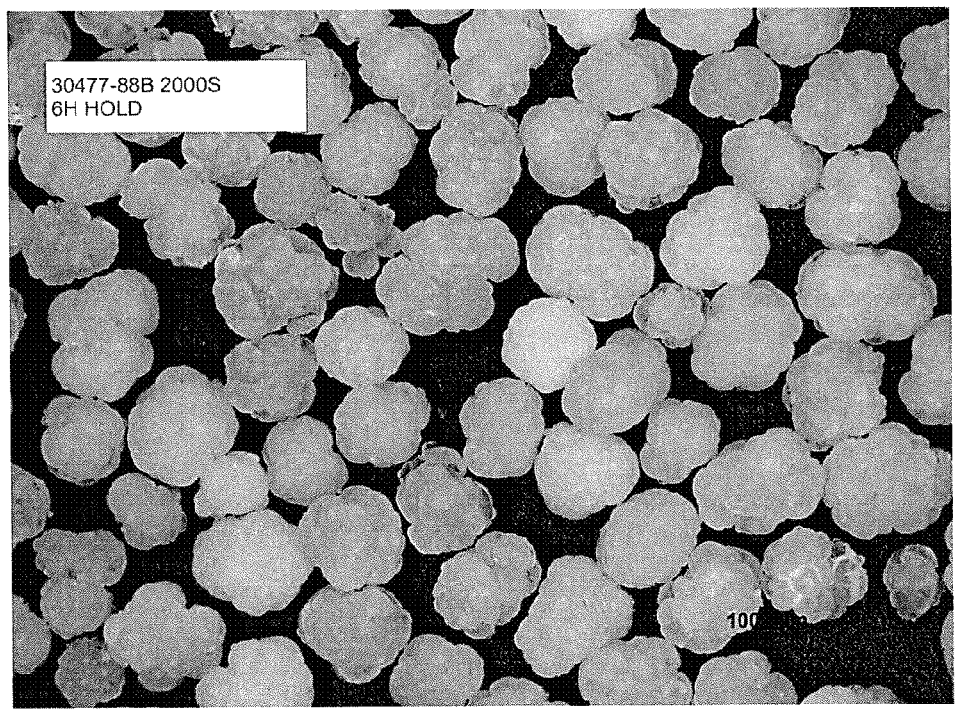
FIG. 6C shown a microscope picture of the polymer of Example 5.
Figure 6D:
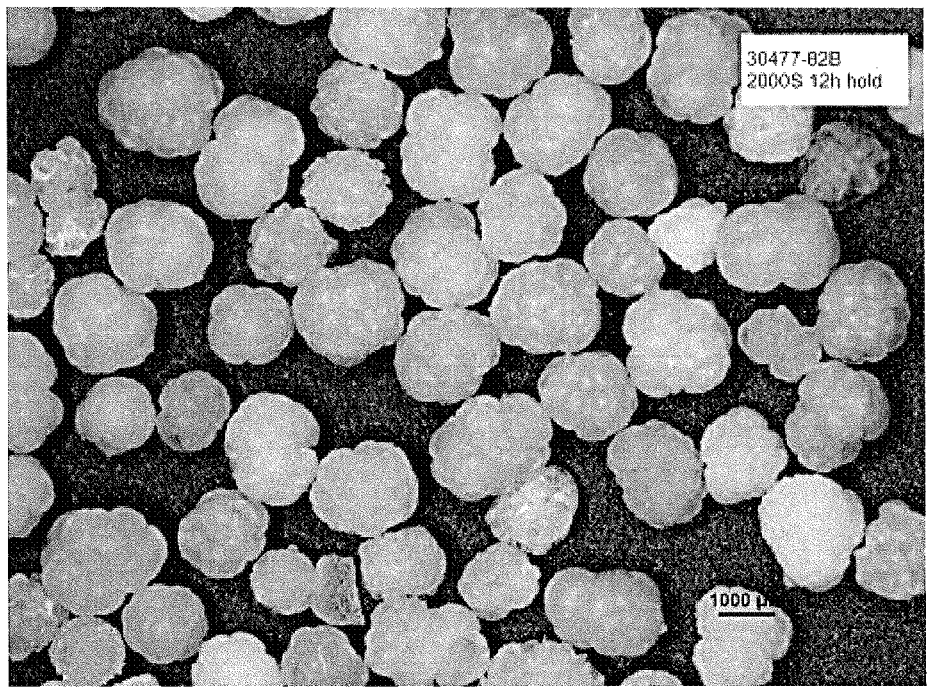
FIG. 6D shows a microscope picture of the polymer of Example 6.

Examples 7-11 Effect of Holding Time/Temperature on Catalyst/Polymer Morphology The catalysts were prepared as in Example 1. The holding time and holding temperature were varied. Ramp speed from holding temperature to 45° C. was 3 hours. The catalysts at holding temperatures in the range of 5-10° C. appear to provide the best polymer morphology. The morphology becomes less spherical and more like the Comparative Example 1 particles as one moves further outside of this range. The results are shown in Table 2. FIG. 6A shows a SEM of the catalyst of Example 9. FIG. 6B shows a SEM of the catalyst of Example 10.

TABLE 2

Effect of holding time/temperature on catalyst/polymer morphology

| Example | temp C. | time h | D50μ | span | d50μ | Span | SPHT3 | Symm3 | B/l3 |
|---|---|---|---|---|---|---|---|---|---|
| Example 7 | 10 | 2 | 47.0 | 0.92 | 2097 | 0.49 | 0.87 | 0.89 | 0.77 |
| Example 8 | 10 | 2 | 40.2 | 0.85 | 1884 | 0.49 | 0.89 | 0.90 | 0.77 |
| Example 9 | 10 | 4 | 44.4 | 1.28 | 1561 | 0.59 | 0.90 | 0.91 | 0.79 |
| Example 10 | 10 | 6 | 37.9 | 0.69 | 1510 | 0.49 | 0.91 | 0.91 | 0.80 |
| Example 11 | 15 | 4 | 43.9 | 0.82 | 1796 | 0.43 | 0.90 | 0.89 | 0.77 |

Figure 7A:
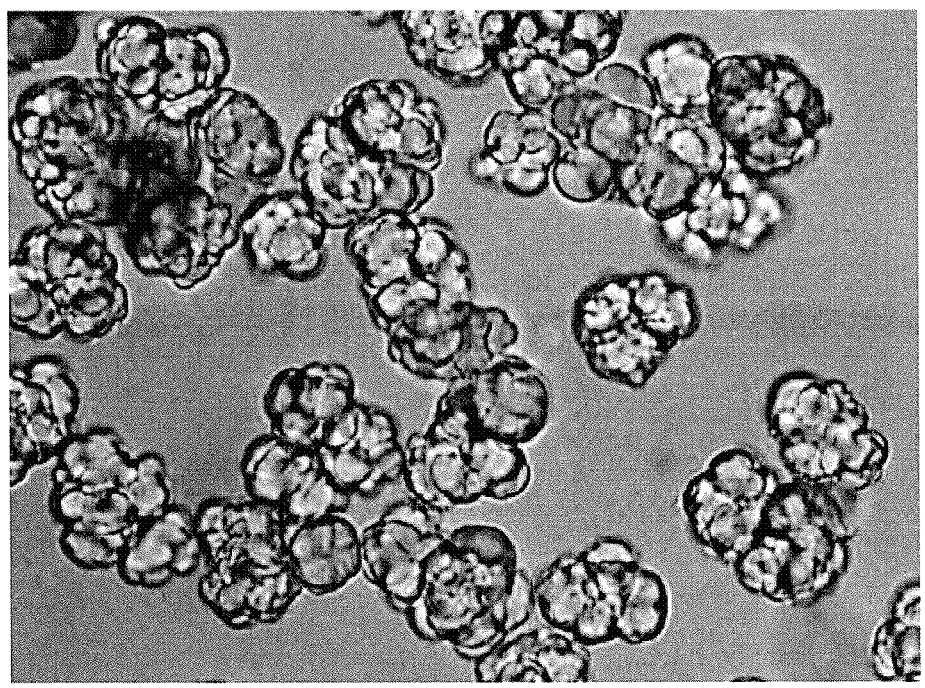
FIG. 7A shows a microscope picture of the catalyst of Example 14.
Figure 7B:
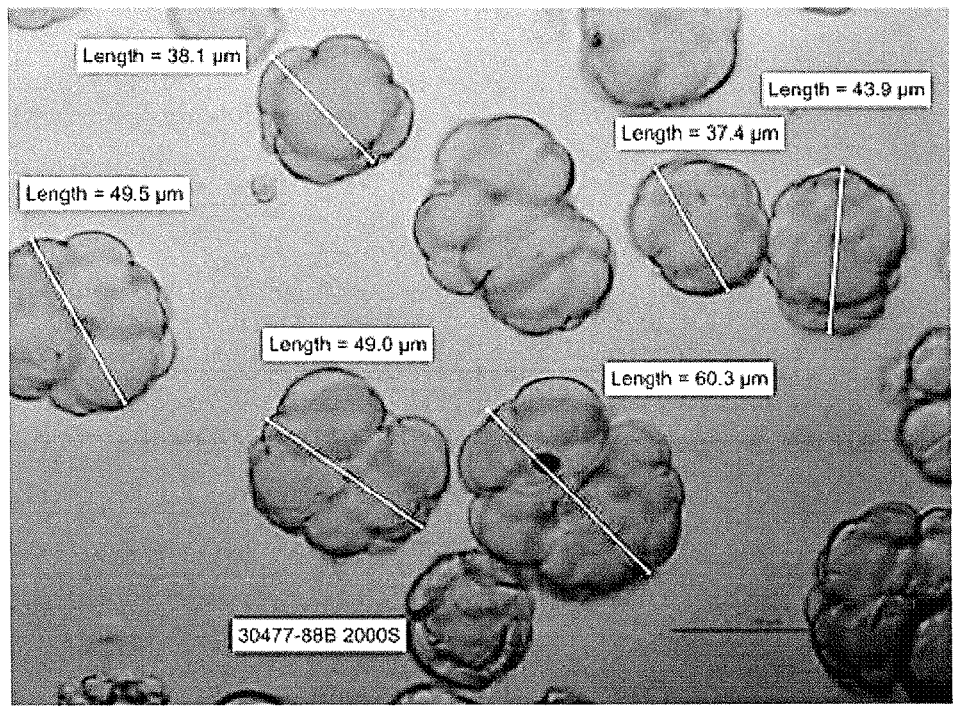
FIG. 7B shows a microscope picture of the catalyst of Example 13.
Figure 7C:
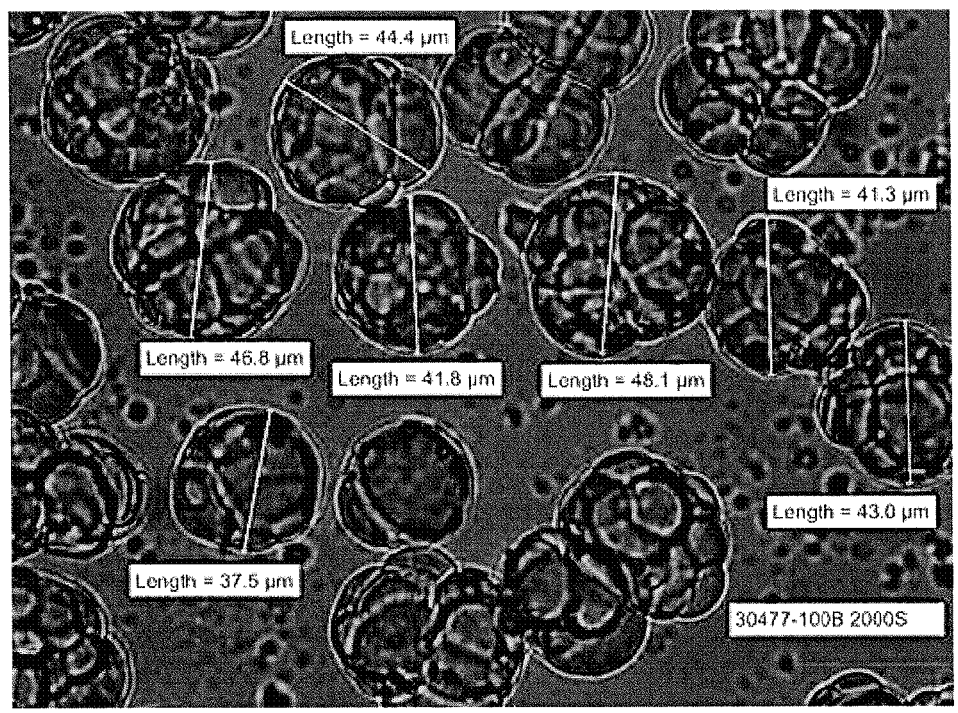
FIG. 7C shows a microscope picture of the catalyst of Example 12.

Examples 12-15 Effect of Ramping Speed from 5° C. To 45° C. On Catalyst/Polymer Morphology The catalysts were prepared as in Example 1. The ramp duration was varied. The temperature was held at 5° C. for 6 hours. The ramping speed from 5-45° C. is critical for the morphology. Catalyst morphology becomes more like that of Comparative Example 1 with faster ramp speeds. Slower ramp speeds resulted in an improved morphology. The results are shown in Table 3. FIG. 7A shows a SEM of the catalyst of Example 14. FIG. 7B shows a SEM of the catalyst of Example 13. FIG. 7C shows a SEM of the catalyst of Example 12.

TABLE 3

Effect of ramping speed from 5° C. to 45° C. on catalyst/polymer morphology

| Example | Ramp h | D50μ | span | d50μ | Span | SPHT3 | Symm3 | B/l3 |
|---|---|---|---|---|---|---|---|---|
| Example 12 | 4.5 | 43.0 | 0.84 | 1676 | 0.52 | 0.89 | 0.90 | 0.79 |
| Example 13 | 3.0 | 43.0 | 0.81 | 1736 | 0.47 | 0.91 | 0.92 | 0.80 |
| Example 14 | 2.0 | 33.2 | 0.76 | 1407 | 0.50 | 0.85 | 0.87 | 0.72 |
| Example 15 | 1.0 | 27.1 | 0.90 | 1193 | 0.60 | 0.81 | 0.86 | 0.72 |

Example 16 and Comparative Example 3 Effect of Ramping Speed from 5° C. To 45° C. On Catalyst/Polymer Morphology Example 16 and Comparative Example 3 catalysts were produced in the SEMI-commercial plant. Example 16 was prepared by 5° C. hold for 12 hours. The temperature ramp was from 5° C. to 45° C. in 4.5 hours. The comparative example 3 was prepared as comparative example 1 but with larger scale. Example 16 had comparable catalyst activity and produced the same polymer properties as Comparative Example 3.

TABLE 4

Large scale synthesis of Example 16 and Comparative Example 3

| Example | Product | DIOP % | Ti % | Mg % | D50μ | Span | CE Kg/g | XS % | BD g/ml | MI Dg/min | Polym D50μ | Span |
|---|---|---|---|---|---|---|---|---|---|---|---|---|
| Comparative Example 3 | L2010HA | 17.3 | 1.4 | 19.3 | 37.2 | 1.19 | 52.2 | 1.9 | 0.438 | 4.3 | 1728 | 0.61 |
| Example 16 | 2000HAS | 16.4 | 1.7 | 19.4 | 36.5 | 0.68 | 51.8 | 2.1 | 0.464 | 5.0 | 1597 | 0.35 |

Examples 17-20 Effect of Holding Temperature on Catalyst Morphology

Example 17 was prepared according to the following method.

A mixture (29 g Toluene, 3.3 g epichlorohydrin, and 8.58 g tributylphosphate) and 3.3 g $MgCl_2$ were transferred to 250 mL reactor. The mixture was heated and agitated at 60° C. at 400 rpms for 5 hours. Toluene (34 g) was added and the mixture was heated to 60° C. and agitated at 400 rpms. Phthalic anhydride (1.086 g) was added to the reactor at 60° C. and the mixture was stirred for 1 hour. The mixture was cooled down to −28° C. reactor temperature. The agitation was maintained at 400 rpms. The first one-third of $TiCl_4$ (65.3 g) was slowly added to the reactor maintaining the reaction temperature at −25° C. over 90 min. The agitation rate was lowered to 250 rpms. The reaction temperature was then ramped from −25° C. to 0° C. at the rate of 0.5° C./min, held at 0° C. for 4 hours, ramped from 0° C. to 45° C. at the rate of 0.22° C./min and 45° C. to 85° C. in 30 min and the mixture was stirred for 1 hour at 85° C. at 250 rpms. The heating and agitator were turned off and the reaction mixture was filtered. The solids were washed four times with 33 ml toluene agitating at 400 rpms for 5 min. A 5 vol % $TilC_4$/toluene (66 ml) and di-n-butylphthalate (1 ml) was transferred into the reactor and the mixture was stirred at 120° C. for 1 hour at 400 rpms. The agitation was turned off and the supernatant was filtered. A 5 vol % $TilC_4$/toluene (66 ml) was transferred into the reactor and the mixture was stirred at 100° C. for 30 minutes at 400 rpms. The agitation was turned off and the supernatant was filtered. A 5 vol % $TiCl_4$/toluene (66 ml) was transferred into the reactor and the mixture was stirred at 100° C. for 30 minutes at 400 rpms. The agitation was turned off and the supernatant was filtered. A 5 vol % $TilC_4$/toluene (66 ml) was transferred into the reactor and the mixture was stirred at 100° C. for 30 minutes at 400 rpms. The agitation was turned off and the mixture was filtered. The jacket temperature was lowered to 65° C. and solids were washed with 40 ml hexane four times (10 min each). Examples 18-20 were performed the same way except the holding temperature was varied between 0 and 15° C.

Figure 8A:
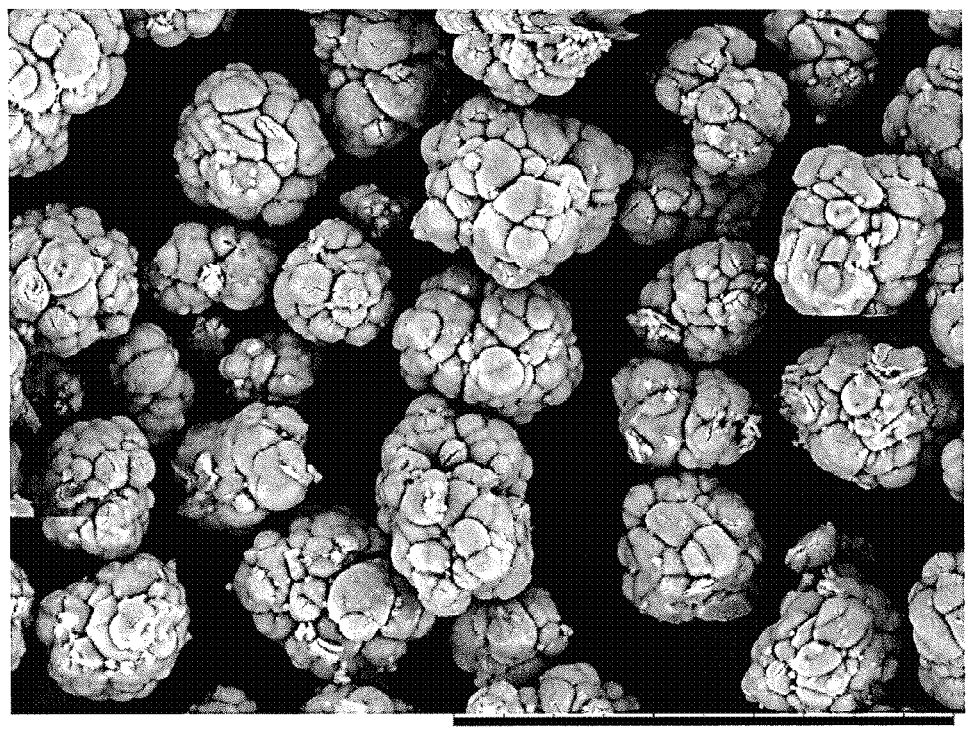
FIG. 8A shows a SEM of the catalyst of Example 17.
Figure 8B:
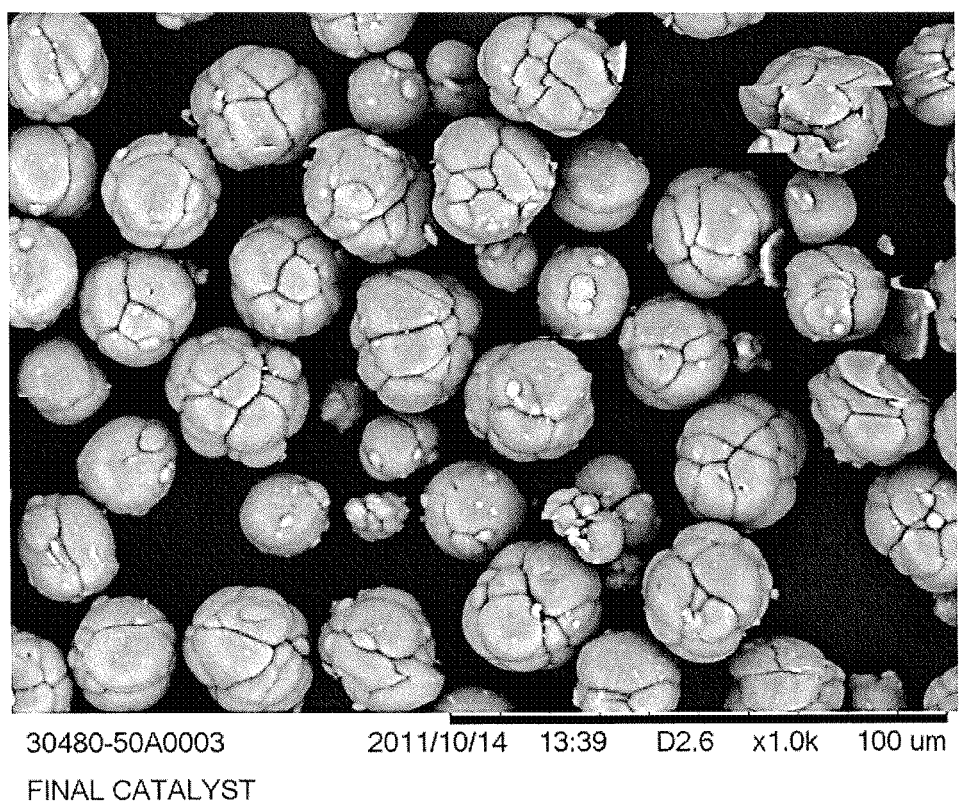
FIG. 8B shows a SEM of the catalyst of Example 18.
Figure 8C:
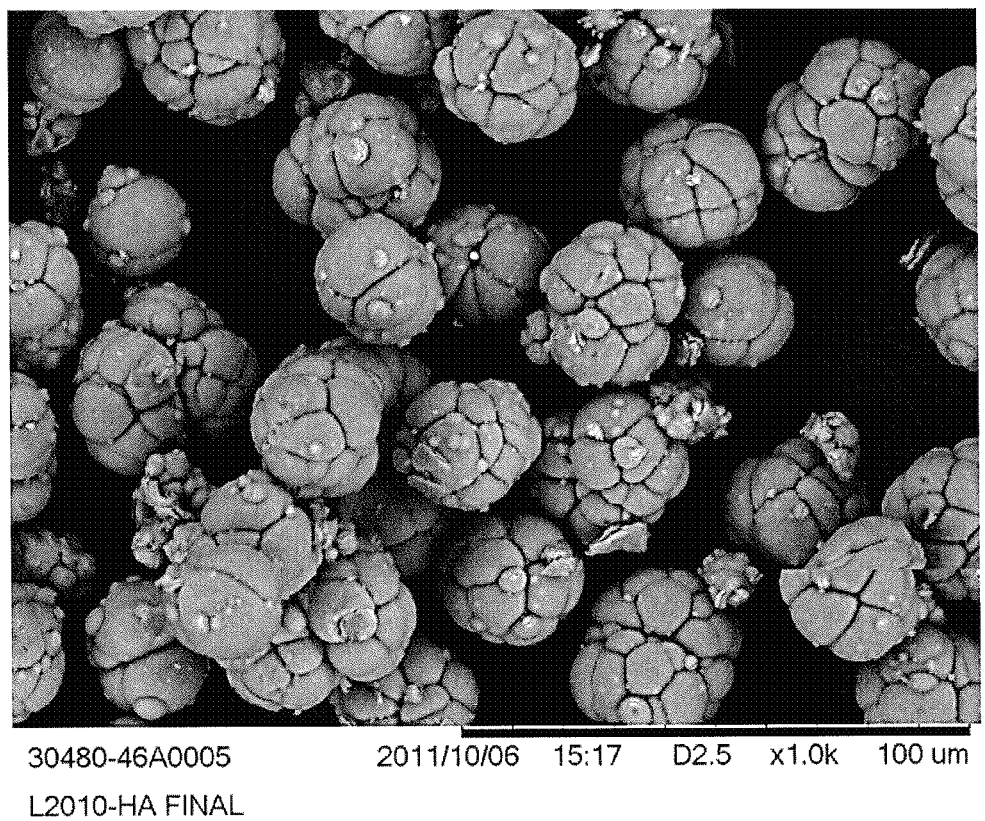
FIG. 8C shows a SEM of the catalyst of Example 19.
Figure 8D:
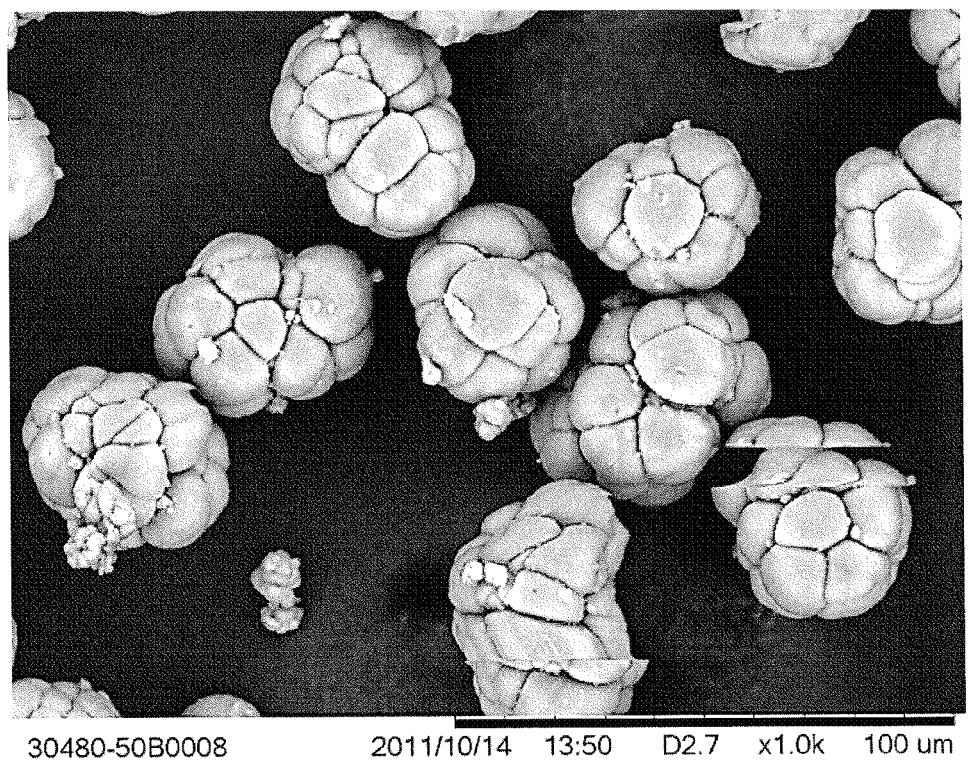
FIG. 8D shows a SEM of the catalyst of Example 20.

The catalyst particle size, SEM pictures and polymer Camsizer morphology data are shown in Table 3 and in FIGS. 8A-D, with FIG. 8A showing a SEM of the catalyst of Example 17, FIG. 8B showing a SEM of the catalyst of Example 18, FIG. 8C showing a SEM of the catalyst of Example 19, and FIG. 8D showing a SEM of the catalyst of Example 20.

TABLE 3

Catalyst size distribution and polymer morphology factors.

| SAMPLE (RX) | Holding Temp (C.) | Catalyst D10(μ) | Catalyst D50(μ) | Catalyst D90(μ) | Span | SPHT3 | Symm3 | b/l3 |
|---|---|---|---|---|---|---|---|---|
| Example 17 | 0 | 22.3 | 34.8 | 53.9 | 0.909 | 0.885 | 0.897 | 0.765 |
| Example 18 | 5 | 16.2 | 27.2 | 39.2 | 0.844 | 0.872 | 0.898 | 0.787 |
| Example 19 | 10 | 14.8 | 29.9 | 46.5 | 1.062 | 0.875 | 0.895 | 0.774 |
| Example 20 | 15 | 26.4 | 43.2 | 61.4 | 0.811 | 0.875 | 0.895 | 0.771 |

From the SEM picture, the best morphology was the catalyst prepared between 5-10° C. The catalyst morphology at 0° C. holding temperature had more clusters of small particle domains. The individual domains became larger by holding around 5-10° C. It appears that the catalyst elongated by holding at 15° C.

What is claimed is:

1. A process for preparing a catalyst system used in olefinic polymerization, said process comprising the following steps:
   (a) dissolving a magnesium compound, an organic oxygenate and an organic compound containing a group V element in at least one organic solvent to form a solution, the at least one organic solvent comprising toluene or ethyl benzene;
   (b) dissolving an auxiliary precipitant in said solution;
   (c) contacting a titanium compound with said solution to form a first mixture containing the magnesium compound and the titanium compound;
   (d) maintaining said first mixture at a temperature of about 5° C. to about 35° C. for at least 2 hours;
   (e) increasing the temperature of said first mixture to a temperature of about 40° C. to about 50° C. over a period of at least 3 hours;
   (f) increasing the temperature of said first mixture to a temperature of about 80° C. to about 90° C.;
   (g) collecting flocculated solids from the first mixture;
   (h) washing said flocculated solids from the first mixture with a second mixture of said titanium compound and at least one aromatic organic solvent to form washed flocculated solids from the first mixture; and
   (i) treating said washed flocculated solids from the first mixture with a third mixture of said titanium compound and at least one aromatic organic solvent to produce substantially spherical catalyst particles having a diameter of from about 20 microns to about 45 microns (on a 50% by volume basis).

2. The process of claim 1 wherein at least one of said first, second or third titanium compound is $TiCl_4$.

3. The process of claim 1, wherein step (f), (g), (h) and/or (i) further comprises adding an electron donor.

4. The process of claim 3, wherein said electron donor is a carboxylic acid ester, an organic diether or an organic compound containing keto and ether groups.

5. The process of claim 4, wherein said carboxylic acid ester is a phthalate or 1,8-naphthyl benzoate.

6. The process of claim 4, wherein said organic compound is 1-[9-(methoxymethyl)fluoren-9-yl]alkan-1-one.

7. The process of claim 1, wherein in step (a) said organic oxygenate is an epoxy compound.

8. The process of claim 1, wherein in step (a) said organic compound containing a group V element is a phosphorus compound.

9. The process of claim 1, wherein said auxiliary precipitant is selected from the group consisting of succinic anhydride, maleic anhydride, naphthalic anhydride, diethylmaleate, diethylmalonate, dibutylmalonate, diethyladipate, dibutyladipate, di-n-butylphthalate, di-n-octylphthalate, di-i-butylphthalate, di-n-nonylphthalate, dibutylether diisoamylether, dihexyelether, and phthalic anhydride.

10. The process of claim 1, wherein said magnesium compound is $MgCl_2$.

11. Catalyst particles for use in olefinic polymerization made by a process comprising the following steps:
  (a) dissolving a magnesium compound, an organic oxygenate and an organic compound containing a group V element in at least one organic solvent to form a solution, the at least one organic solvent comprising toluene or ethyl benzene;
  (b) dissolving an auxiliary precipitant in said solution;
  (c) contacting a titanium compound with said solution to form a first mixture containing the magnesium compound and the titanium compound;
  (d) maintaining said first mixture at a temperature of about 5° C. to about 35° C. for at least 2 hours;
  (e) increasing the temperature of said first mixture to a temperature of about 40° C. to about 50° C. over a period of at least 3 hours;
  (f) increasing the temperature of said first mixture to a temperature of about 80° C. to about 90° C.;
  (g) collecting flocculated solids from the first mixture;
  (h) washing said flocculated solids from the first mixture with a second mixture of said titanium compound and at least one aromatic organic solvent to form washed flocculated solids from the first mixture; and
  (i) treating said washed flocculated solids from the first mixture with a third mixture of said titanium compound and at least one aromatic organic solvent to produce substantially spherical catalyst particles having a diameter of from about 20 microns to about 45 microns (on a 50% by volume basis).

12. The process of claim 11 wherein at least one of said first, second or third titanium compound is $TiCl_4$.

13. The process of claim 11, wherein step (f), (g), (h) and/or (i) further comprises adding an electron donor.

14. The process of claim 11, wherein said electron donor is a phthalate or 1,8-naphthyl benzoate.

15. The process of claim 11, wherein said electron donor is 1-[9-(methoxymethyl)fluoren-9-yl]alkan-1-one.

16. The process of claim 11, wherein in step (a) said organic oxygenate is an epoxy compound.

17. The process of claim 11, wherein in step (a) said organic compound containing a group V element is a phosphorus compound.

18. The process of claim 11, wherein said auxiliary precipitant is phthalic anhydride.

19. The process of claim 11 wherein said magnesium compound is $MgCl_2$.

20. A method of polymerizing or copolymerizing an olefin, comprising the step of:
  contacting an olefin with catalyst particles made by a process comprising the following steps:
  (a) dissolving a magnesium compound, an organic oxygenate and an organic compound containing a group V element in at least one organic solvent to form a solution, the at least one organic solvent comprising toluene or ethyl benzene;
  (b) dissolving an auxiliary precipitant in said solution;
  (c) contacting a titanium compound with said solution to form a first mixture containing the magnesium compound and the titanium compound;
  (d) maintaining said first mixture at a temperature of about 5° C. to about 35° C. for at least 2 hours;
  (e) increasing the temperature of said first mixture to a temperature of about 40° C. to about 50° C. over a period of at least 3 hours;
  (f) increasing the temperature of said first mixture to a temperature of about 80° C. to about 90° C.;
  (g) collecting flocculated solids from the first mixture;
  (h) washing said flocculated solids from the first mixture with a second mixture of said titanium compound and at least one aromatic organic solvent to form washed flocculated solids from the first mixture; and
  (i) treating said washed flocculated solids from the first mixture with a third mixture of said titanium compound and at least one aromatic organic solvent to produce substantially spherical catalyst particles having a diameter of from about 20 microns to about 45 microns (on a 50% by volume basis).

* * * * *